(12) United States Patent
Gross

(10) Patent No.: US 11,282,523 B2
(45) Date of Patent: Mar. 22, 2022

(54) VOICE ASSISTANT MANAGEMENT

(71) Applicant: Lucyd Ltd, London (GB)

(72) Inventor: Harrison Gross, North Miami, FL (US)

(73) Assignee: Lucyd Ltd, London (GB)

( * ) Notice: Subject to any disclaimer, the term of this patent is extended or adjusted under 35 U.S.C. 154(b) by 94 days.

(21) Appl. No.: 16/829,841

(22) Filed: Mar. 25, 2020

(65) Prior Publication Data
US 2021/0304743 A1 Sep. 30, 2021

(51) Int. Cl.
*G10L 15/22* (2006.01)
*G10L 15/30* (2013.01)
(Continued)

(52) U.S. Cl.
CPC .............. *G10L 15/22* (2013.01); *G06F 3/167* (2013.01); *G10L 13/00* (2013.01); *G10L 15/30* (2013.01); *G10L 2015/223* (2013.01)

(58) Field of Classification Search
USPC .................................... 704/1–504, 251, 231
See application file for complete search history.

(56) References Cited

U.S. PATENT DOCUMENTS

| 4,904,078 A | 2/1990 | Gorike |
| 9,081,213 B2 | 7/2015 | Weinberg |

(Continued)

FOREIGN PATENT DOCUMENTS

| CN | 103309226 A | 9/2013 |
| CN | 203313378 U | 11/2013 |

(Continued)

OTHER PUBLICATIONS

Bose Frames Audio Sunglasses, Black. Online. Internet. Accessed Sep. 27, 2019. https://www.amazon.com/Bose-Frames-Audio-Sunglasses-Black/dp/B07P7VVCDD/ref=asc_df_B07P7VVCDD/?tag=hyprod-20&linkCode=df0&hvadid . . . .

(Continued)

*Primary Examiner* — Marcus T Riley
(74) *Attorney, Agent, or Firm* — Ellenoff Grossman & Schole LLP; John C. Stellabotte

(57) ABSTRACT

Apparatus and associated methods relate to a web-enabled mobile device operating voice assistant manager software configured and programmed to receive a request for a web-enabled operation, construct a voice command configured to implement the operation using a device-level voice assistant, and provide a voice indication of the operation result when the voice assistant is activated with the constructed voice command. In an illustrative example, the requested operation may be user designated in a web-enabled device visual interface. The operation may be an action, including, for example, user actions recorded from the visual interface, including text selection, form input, taps, or clicks, permitting construction of a voice command configured to implement the actions. In some examples, the operation may be a data retrieval operation providing a result vocalized to the user through the web-enabled device. Various examples may advantageously provide improved interoperability and enhanced ease of access between users, the user's web-enabled devices, software applications operating on the user's web-enabled devices, and various diverse device-level voice assistant implementations.

25 Claims, 18 Drawing Sheets

(51) Int. Cl.
*G06F 3/16* (2006.01)
*G10L 13/00* (2006.01)

(56) References Cited

U.S. PATENT DOCUMENTS

| | | | |
|---|---|---|---|
| 9,201,578 | B2 | 12/2015 | Scott et al. |
| 9,253,806 | B2 | 2/2016 | Choi et al. |
| 9,277,159 | B2 | 3/2016 | Shin et al. |
| 9,535,497 | B2 | 1/2017 | Rose et al. |
| 9,589,390 | B2 | 3/2017 | DeStories et al. |
| 9,753,303 | B2 | 9/2017 | Billetz et al. |
| 9,929,987 | B2 | 3/2018 | Bouzid et al. |
| 10,037,084 | B2 * | 7/2018 | Joo .................... G02B 27/0172 |
| 10,412,633 | B1 | 9/2019 | Kotecha et al. |
| 10,437,437 | B1 | 10/2019 | Ledet |
| 10,528,228 | B2 | 1/2020 | Seixeiro et al. |
| 10,534,900 | B2 * | 1/2020 | Cheong .................... H04W 4/00 |
| 10,860,100 | B2 * | 12/2020 | Osterhout ................ G06F 3/013 |
| 10,908,419 | B2 * | 2/2021 | Gross ....................... G06F 3/011 |
| 2007/0220108 | A1 | 9/2007 | Whitaker |
| 2009/0097688 | A1 * | 4/2009 | Lewis ................... H04R 5/0335 381/376 |
| 2011/0054647 | A1 | 3/2011 | Chipchase et al. |
| 2011/0276327 | A1 | 11/2011 | Foxenland |
| 2012/0004919 | A1 * | 1/2012 | Muth .................... H04N 13/341 704/500 |
| 2012/0200499 | A1 * | 8/2012 | Osterhout ................ G06F 1/163 345/158 |
| 2012/0201362 | A1 | 8/2012 | Crossan et al. |
| 2013/0177194 | A1 * | 7/2013 | Han ........................ H04R 1/105 381/381 |
| 2014/0028780 | A1 * | 1/2014 | Croen .................... H04N 7/141 348/14.03 |
| 2014/0140531 | A1 | 5/2014 | Lee et al. |
| 2014/0336781 | A1 | 11/2014 | Katyal et al. |
| 2015/0081734 | A1 | 3/2015 | Mason |
| 2015/0100621 | A1 | 4/2015 | Pan |
| 2015/0100632 | A1 | 4/2015 | Panjabi |
| 2015/0180809 | A1 | 6/2015 | Doulton |
| 2015/0289217 | A1 * | 10/2015 | Ban ......................... H04W 4/80 455/41.2 |
| 2015/0358614 | A1 * | 12/2015 | Jin ....................... G06F 3/03545 348/49 |
| 2015/0379896 | A1 * | 12/2015 | Yang .................... G02B 27/017 434/112 |
| 2016/0012465 | A1 * | 1/2016 | Sharp .................... G06Q 20/386 705/14.17 |
| 2016/0026253 | A1 * | 1/2016 | Bradski ................ H04N 13/167 345/8 |
| 2016/0070439 | A1 * | 3/2016 | Bostick .................... G06F 3/013 715/728 |
| 2016/0078512 | A1 | 3/2016 | Yopp et al. |
| 2016/0224317 | A1 | 8/2016 | Thompson et al. |
| 2016/0236614 | A1 | 8/2016 | Heo |
| 2017/0011210 | A1 * | 1/2017 | Cheong .................... H04W 4/00 |
| 2017/0103440 | A1 * | 4/2017 | Xing .................... G06F 3/04883 |
| 2018/0091452 | A1 | 3/2018 | Hviid |
| 2018/0144554 | A1 | 5/2018 | Watola et al. |
| 2018/0242219 | A1 * | 8/2018 | Deluca ................ H04L 65/1059 |
| 2018/0277123 | A1 | 9/2018 | Boesen et al. |
| 2018/0286391 | A1 * | 10/2018 | Carey .................... G10L 15/22 |
| 2018/0365175 | A1 * | 12/2018 | Nicholson ............. G06F 13/126 |
| 2019/0080794 | A1 | 3/2019 | Moskowitz |
| 2019/0089456 | A1 | 3/2019 | Kasilya Sudarsan et al. |
| 2019/0228780 | A1 * | 7/2019 | Athias ..................... G06F 21/32 |
| 2019/0306105 | A1 | 10/2019 | Snibbe |
| 2019/0378515 | A1 | 12/2019 | Kim et al. |
| 2020/0004016 | A1 * | 1/2020 | Gross ................. H04M 1/72412 |
| 2021/0082011 | A1 * | 3/2021 | Cohen ....................... G06F 3/011 |
| 2021/0304743 | A1 * | 9/2021 | Gross ..................... G10L 13/00 |

FOREIGN PATENT DOCUMENTS

| | | |
|---|---|---|
| CN | 105354161 A | 2/2016 |
| CN | 103713737 | 1/2017 |
| EP | 1857856 A1 | 11/2007 |
| EP | 2739055 A1 | 6/2014 |
| KR | 20120139195 A | 12/2012 |
| KR | 200465087 Y1 | 2/2013 |
| WO | 2013171731 A1 | 11/2013 |
| WO | 2017031033 A1 | 2/2017 |
| WO | 2017096099 A1 | 6/2017 |
| WO | 2018059934 A1 | 4/2018 |

OTHER PUBLICATIONS

Amazon Smart Bluetooth Headset Glasses, Detachable Outdoor Car Universal HD Polarized Sunglasses for Driving, Outdoor Fish . . . Online. Internet. Accessed Oct. 1, 2019. https://www.amazon.com/Smart-Bluetooth-Detachable-Universal-Sunglasses/dp/B07QHS5G9M.

Amazon Kodak Prescription Eyeglasses Alien 5 Bone Conduction Glasses Blue Ray Filtering Wireless Bluetooth 4.1 Headphones Myopia Hyperopia Astigmatism Waterproof for IOS Android (Bright Black Frame). Online. Internet. Accessed Oct. 1, 2019. https://www.amazon.com/Prescription-Eyeglasses-Conduction-Headphones-Astigmatism/dp/B07NTDJ9N7/ref=sr_1_3?keywords=smart+glasses+pre . . . .

Amazon Duco Sunglasses for Men Over Glasses Sunglasses for Women Polarized Sunglasses 8953. Online. Internet. Accessed Sep. 27, 2019. https://www.amazon.com/dp/B07MZ2CT99?ref_=ams_ad_dp_ovrl.

Hadar, et al. "Working Memory Load Affects Processing Time in Spoken Word Recognition: Evidence from Eye-Movements." Frontiers in Neuroscience, May 19, 2016.

Jones, Skott E. "Adult Word Learning as a Function of Neighborhood Density." Languages, Mar. 6, 2018.

"Landscape of AR companies with product announcements or product availability."

"Waveguide comparison spreadsheet."

Proof of Concept Optical Engineering, LLC. "Review of Smartglasses Demonstrated at CES 2018." Jan. 17, 2018.

WaveOptics Ltd. "Unlocking Augmented Reality with World Class Optical Technology," 2018.

Karthika, et al. "Hololens." International Journal of Computer Science and Mobile Computing, vol. 6, Issue 2, Feb. 2017, pp. 41-50.

Lenovo Group Limited. "Lenovo New Glass C200 Adds Smart Glasses to Portfolio." Online. Internet. Published Jan. 3, 2017. Accessed Jul. 12, 2019. http://blog.lenovo.com/en/blog/lenovo-new-glass-c200-adds-smart-glasses-to-portfolio/.

Shen, et al. "Semantic information mediates visual attention during spoken word recognition in Chinese: Evidence from the printed-word version of the visual-world paradigm." Attention, Perception, & Psychophysics, Jul. 2016. vol. 78, Issue 5, pp. 1267-1284.

Vuzix Corporation. "M100 Smart Glasses Product Guide, Enterprise Edition." Product Manual, 2015.

AliExpress Newest Bluetooth headset sunglasses music microphone bone conduction Open type headset touch control compatible with myopia lens. Online. Internet. Accessed Apr. 24, 2019. https://www.aliexpress.com/item/Newest-Bluetooth-headset-sunglasses-music-microphone-bone-conduction-Open-type-headset-touch-control-compatible-with-myopia/32839211496.html?spm=2114.search0104.3.9.21df694c14Mfwl&ws_ab_test=searchweb0_0,searchweb201602_8_10065_10130_10068_10890_10547_319_10546_317_10548_10545_10696_453_10084_454 . . . .

Amazon Vocal Skull Alien 5 Bone Conduction Glasses Polarized Sunglasses Headphones Headset Music Stereo Hearing Aid for Sports Running Cycling Hiking iOS Android Matted Black Frame (Frame+Mold Lens). Online. Internet. Accessed Apr. 24, 2019. https://www.amazon.com/Vocal-Skull-Conduction-Sunglasses-Headphones/dp/B07KLSSQST.

Bose Frames Alto. Online Internet. Accessed Apr. 24, 2019. https://www.bose.com/en_us/products/wearables/frames/bose-frames-alto.html.

(56) References Cited

OTHER PUBLICATIONS

Bose Frames Rondo. Online. Internet. Accessed Apr. 24, 2019. https://www.bose.com/en_us/products/wearables/frames/bose-frames-rondo.html.
Bose Frames. Online. Internet. Accessed Apr. 24, 2019. https://www.bose.com/en_us/products/wearables/frames.html.
Lucyd Upgrade Your Eyewear. Online. Internet. Accessed Apr. 24, 2019. https://www.lucyd.co/.
Zungle. Online. Internet. Accessed Apr. 24, 2019. https://www.zungleinc.com.
HearMeOut—App, http://home.hearmeoutapp.com/our-product/#.
Quora, https://www.quora.com/Is-there-a-voice-based-social-network.
RoadSpeak, Smaldone et al., https://www.researchgate.net/publication/234779138_RoadSpeak_enabling_voice_chat_on_roadways_using_vehicular_social_networks.
Listen App, http://www.listen.me/.
Pair Eyewear glasses, https://paireyewear.com.

* cited by examiner

VOICE ASSISTANT MANAGEMENT

TECHNICAL FIELD

Various embodiments relate generally to web-enabled devices and voice assistant management and control software and methods for use with web-enabled devices.

BACKGROUND

A Voice Assistant (VA) is a device, application, or service configured to provide task assistance to a human user. Some VA designs include features typical of a Virtual Assistant, where the Virtual Assistant features may be accessed by the user through one or more voice command. For example, a VA may monitor or sample a user's speech, to detect a voice command. When a voice command is detected, the VA may implement the user's voice command, to perform an operation requested by the user. The VA can also deliver verbal information in response to a command, and listen for further commands in a feedback loop between the VA and user to further refine a command.

Example operations performed by a VA in response to a user's voice command may include finding open times in schedules to facilitate meetings, researching available options to shop for a desired product or service based on comparing the options located with user preferences, locating or playing music or video, providing or interacting with customer service, interacting with followers through social media on the user's behalf, diagnosing or solving maintenance problems, and searching for information requested by the user. Some VAs may be applications embodied in a physical device accessible to a user. A useful VA may be configured in the cloud, and accessed by the user from the user's mobile device. Some VA implementations may provide personalized assistance enhancing a human user's capability, by offloading time-intensive, data intensive, tedious, or dangerous tasks from the human to the VA when the human activates the VA with a voice command to perform a task. Various Voice Assistant examples include Google® Voice®, Amazon® Alexa®, and Apple® Siri®.

VAs and Virtual Assistants have limitations. Some VA implementations may perform tasks requested by user's voice command, and return the information requested or the task result to the user. Existing VAs do not permit a user to create a request for information indicated by the user via the user's mobile device, direct a VA to perform an operation based on the information indicated by the user in the user's mobile device, and receive the operation result from the VA in verbal form. Although a VA may perform some social media tasks for a human user based on a voice command received from the user, Voice Assistant implementations do not assist the user in verbally communicating with the user's social media followers through social media.

For example, HearMeOut (http://home.hearmeoutapp.com/our-product/#) is a web-enabled application permitting a user to listen to and record audio social media posts through hands-free operation. However, for example, HearMeOut does not permit a user to verbally interact with followers who may be responding to and accessing posts in non-verbal or text media based on configuring a VA with voice commands determined by the user's mobile device in response to an operation requested by the user through the user's mobile device.

US Patent Application Publication US20190306105, entitled "Sonic Social Network," describes an audio social networking environment that provides a platform for users to generate audio-only content including audio-only messages. However, US Patent Application Publication US20190306105 does not, for example, appear to contemplate a user verbally interacting with followers who may be limited to responding to and accessing posts in non-verbal or text media. This patent also refers specifically to transference and modulation of "audio-only content items," while the present claims refer to creation of new voice assistant commands, and novel voice-commenting and "hashtag" functions.

US Patent Application Publication US20180091452, entitled "Audio-based social media platform," discloses a social media platform facilitating sharing audio messages in a hands-free environment. However, US Patent Application Publication US20180091452 does not, for example, appear to teach or suggest enabling a hands-free audio social media platform user to interact verbally with social media followers limiting their interaction to non-verbal or text-based social media activity.

U.S. Pat. No. 9,929,987, entitled "Voice enabled social artifacts," describes services enabling voice messages to be posted on message boards, however U.S. Pat. No. 9,929,987 does not, for example, appear to disclose, suggest, or teach posting the voice messages by a Voice Assistant, based on interaction between the user, the user's existing mobile device, and the Voice Assistant implementation.

U.S. patent Ser. No. 10/437,437, entitled "Method and device for appending information in a conversation in a voice based networking website," describes a digital assistant configured with a notification system to collect notifications from a user's devices, and intelligently present the collected notifications on a single device for the user. However, U.S. patent Ser. No. 10/437,437 does not, for example, appear to disclose configuring the digital assistant with voice commands determined by the user's mobile device in response to an operation requested by the user through the user's mobile device or a mobile device paired or connected with the user's mobile device.

US Patent Application Publication US20150180809, entitled "Selection of a link in a Received Message for Speaking Reply, which is Converted into Text Form for Delivery," discloses connecting a user's device to a conversion system, enabling the user to speak a reply which is then converted to a text reply message. However, US Patent Application Publication US20150180809 does not, for example, appear to disclose configuring the digital assistant with voice commands determined by the user's mobile device in response to an operation requested by the user through the user's mobile device or a mobile device paired or connected to the user's mobile device.

What is needed are improved methods and systems to enhance a user's Voice Assistant experience, and managing a Voice Assistant to perform common mobile information processing tasks, based on improving the interaction between the user, the user's existing mobile device, and Voice Assistant implementations.

SUMMARY

Apparatus and associated methods relate to a web-enabled mobile device operating voice assistant manager software configured and programmed to receive a request for a web-enabled operation, construct a voice command configured to implement the operation using a device-level voice assistant, and provide a verbal indication of the operation result when the voice assistant is given the constructed voice command. In an illustrative example, the requested operation may be user designated in a web-enabled device visual interface. The operation may be an action, including, for example, user actions recorded from the visual interface, including text selection, form input, taps, or clicks, permitting construction of a voice command configured to implement the actions. In some examples, the operation may be a data retrieval operation providing a result vocalized to the user through the web-enabled device. Various examples may advantageously provide improved interoperability and enhanced ease of access between users, the user's web-enabled devices, software applications operating on the user's web-enabled devices, and various diverse device-level voice assistant implementations.

Some embodiments of the present invention relate to techniques improving the functionality of Artificial Intelligence (AI)-based VAs on web-enabled devices, and facilitating improved communication between users of social or private communication platforms that may include messages based on audio or text.

As described in further detail herein below, the methods and systems, and various embodiment devices described herein may employ a virtual interface on a web-enabled device permitting the user to create new voice commands for use with a device-level voice assistant such as Google® Voice®, which may enable the user to perform new handsfree functions such as audibilizing or verbalizing audibly real-time web data or starting a pre-programmed action or action sequence in another app.

The embodiments are designed to expand the accessibility and functionality of device-native and third party voice control options on web-enabled devices, particularly when used in combination with a wirelessly connected wearable such as Bluetooth eyewear. The methods covered are the ability for the user to rapidly code new voice commands, and the verbalization of certain social media tasks, together which greatly improve the functionality of a web-enabled device when controlled solely by the user's voice.

In one aspect, a web-enabled mobile device is provided, comprising: a processor; and, a memory that is not a transitory propagating signal, the memory operably and communicatively coupled with the processor and encoding computer readable instructions, including processor executable program instructions implementing a voice assistant manager software application, the computer readable instructions accessible to the processor, wherein the processor executable program instructions, when executed by the processor, cause the processor to perform operations comprising: receiving a request for the web-enabled device or a web-enabled device paired or connected to the web-enabled device comprising a processor and a memory, to perform a web-enabled operation; recording the operation and associating the operation with a voice command; configuring the voice command for a device level voice assistant to implement the operation, wherein the voice command is configured as a function of the recorded operation; performing the operation at the web-enabled device or a web-enabled device paired or connected to the web-enabled device; and, providing an operation result at the web-enabled device or a web-enabled device paired or connected to the web-enabled device when the device level voice assistant is activated with the configured voice command.

In one embodiment, the operations further comprise playing back the operation to confirm the operation is correct before saving the operation in the memory and associating the operation with the configured voice command.

In another embodiment, the web-enabled mobile device or the web-enabled device paired or connected to the web-enabled device further comprises a visual interface configured in a web-enabled device accessible to the processor.

In another embodiment, the web-enabled device or the web-enabled device paired or connected to the web-enabled device further comprises an audio interface, and the operations performed by the processor further comprise audibilizing or verbalizing audibly the operation result to the user through the audio interface.

In another embodiment, audibilizing or verbalizing audibly the operation result further comprises transforming the operation result into a non-verbal audio representation.

In another embodiment, audibilizing or verbalizing audibly the operation result further comprises transforming the operation result into a verbal audio representation.

In another embodiment, receiving the request further comprises a user action captured from the visual interface.

In another embodiment, configuring the voice command further comprises decompose the user action into at least one action component related to a function of the device level voice assistant.

In another embodiment, configuring the voice command further comprises associate a voice assistant capability with one or more action component related to a function of the device level voice assistant.

In another embodiment, the user action further comprises an action selected from the group consisting of text selection, form input, audio input, and link activation.

In another embodiment, the operation further comprises a verbal hashtag operation.

In another embodiment, the operation further comprises a verbal comment operation.

In another embodiment, the operation further comprises an action operation.

In another embodiment, the operation further comprises a data retrieval operation.

In another aspect, a device level voice assistant manager process implemented on a web-enabled computing device is provided, wherein the web-enabled computing device comprises: a processor, and, a memory coupled with the processor, and wherein the memory encodes processor executable program instructions and data to program and configure the processor to perform operations comprising: receiving a user request captured by a user interface configured in the web-enabled device or a web-enabled device paired or connected to the web-enabled device to perform a web-enabled operation; recording the operation, wherein the operation comprises one or more user action; playing back the recorded operation to confirm the operation is correct; in response to confirming the recorded operation is correct: saving the operation in the memory; configuring a voice command executable by the device level voice assistant to implement the operation, wherein the voice command is configured based on associating a device level voice assistant function with one or more user action included in the confirmed correct recorded operation; performing the operation at the web-enabled device or a web-enabled device paired or connected to the web-enabled device, based on activating the device level voice assistant with the configured voice command; and, providing an operation result to the user when the device level voice assistant is activated.

In one embodiment, the operation further comprises a user action selected from the group consisting of text selection, form input, link activation, and audio input.

In another embodiment, the operation type is selected from the group consisting of action, and data retrieval.

In another embodiment, the operation further comprises an audio operation.

In another embodiment, the audio operation further comprises a verbal hashtag operation.

In another embodiment, the audio operation further comprises a verbal comment operation.

In another aspect, a process to create a voice command executable by a device level voice assistant to implement an operation for a web-enabled device is provided, the process comprising: receiving an operation request for the web-enabled device or a web-enabled device paired or connected to the web-enabled device to perform a web-enabled social media operation; recording the operation, wherein the operation comprises one or more user action; playing back the recorded operation to confirm the operation is correct; in response to confirming the recorded operation is correct: storing the operation; configuring a voice command executable by the device level voice assistant to implement the operation, wherein the voice command is configured based on associating a device level voice assistant function with one or more user action included in the confirmed correct recorded operation; performing the operation at the web-enabled device or a web-enabled device paired or connected to the web-enabled device, based on activating the device level voice assistant with the configured voice command; and, providing an operation result at the web-enabled device or the web-enabled device paired or connected to the web-enabled device when the device level voice assistant is activated with the configured voice command.

In one embodiment, the social media operation further comprises an audio operation.

In another embodiment, the audio operation further comprises retrieve from a social media platform a social media post located as a function of an audio hashtag or audio comment identified based on audio provided with the operation request.

In another embodiment, the audio operation further comprises: transforming the retrieved social media post to audible form; delivering the audible social media post to the user; receiving audio comprising a user response to the audible social media post; and, posting the user response to the social media platform.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
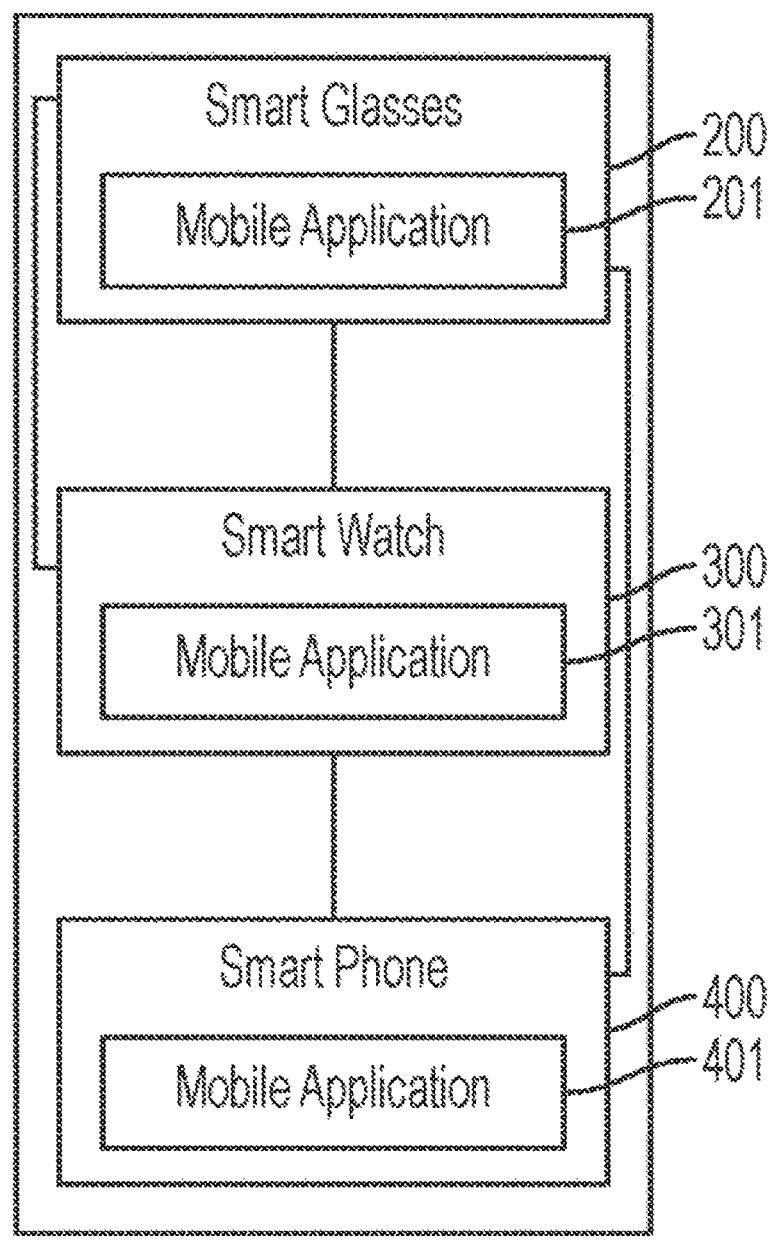
FIG. 1 depicts a schematic diagram of a system for using artificial intelligence to control mobile devices used for presentation and display of mobile device tasks and control mobile devices used for presentation and display of mobile device tasks and applications and enhance presentation and display of augmented reality information with smartglasses or other mobile devices paired or connected to smartglasses, while not reducing visual acuity.

System 100 of FIG. 1 can include smartglasses 200, an optional mobile application 201 resident on the smartglasses 200, smartwatch 300 with mobile application 301, and smartphone 400 with mobile application 401. The mobile application 201, mobile application 301, or mobile application 401 may include a device level voice assistant manager process implementation configured and programmed to receive a request for a web-enabled operation, construct a voice command configured to implement the operation using a device-level voice assistant, and provide a voice indication of the operation result when the voice assistant is activated with the constructed voice command. The device level voice assistant manager process may be programmed to activate a device level voice assistant to perform an operation requested by a user, based on configuring the device level voice assistant with voice commands determined by the device level voice assistant manager process executing on the user's mobile device, in response to an operation requested by the user through the user's mobile device.

Figure 2:
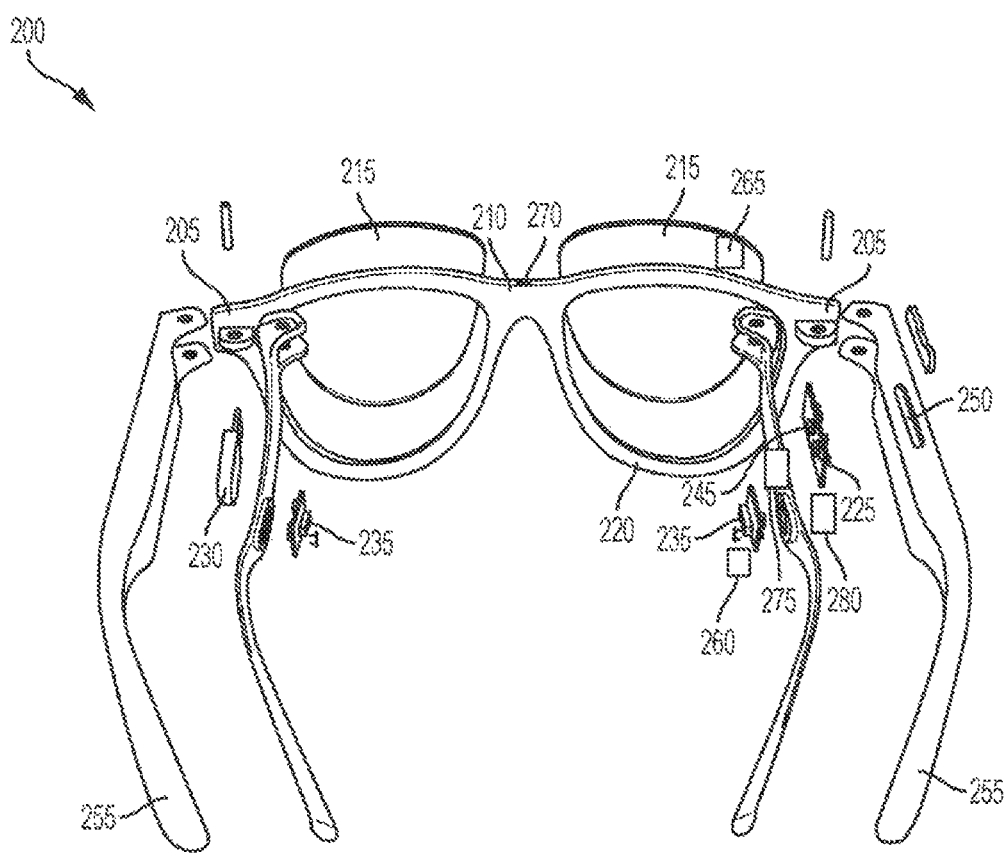
FIG. 2 illustrates smartglasses that can be used in accordance with the methods and systems for using artificial intelligence to control mobile devices used for presentation and display of mobile device tasks and control mobile devices used for presentation and display of mobile device tasks and applications and enhance presentation and display of augmented reality information with smartglasses or other mobile devices paired or connected to smartglasses, while not reducing visual acuity.

FIG. 2 depicts smartglasses 200 that can be used in accordance with the methods and systems for using artificial intelligence to enhance experiencing augmented reality information described herein. The smartglasses 200 can have a bridge 210 with end pieces 205 connected to temples 255 and corrective lenses 215 in rims 220. The temples 255 include a microphone 225, battery 230, bone conduction speakers 235, printed circuit board 245, control pad 250, connectivity module and hardware 260, camera 265, and USB connection 270, and cellular communications unit and hardware 275, which enables the smartglasses 200 to communicate over the cellular wireless network, and smartglasses AI interface 280, all of which are electronically connected.

The connectivity module and hardware 260 may use WiFi, Bluetooth, near field communication, and/or other types of wireless technology standards to pair and/or communicate with other mobile devices, including smartphones and smartwatches, such as smartwatch 300 and smartphone 400. Other components not depicted could also be included in the smartglasses 200.

Figure 3A:
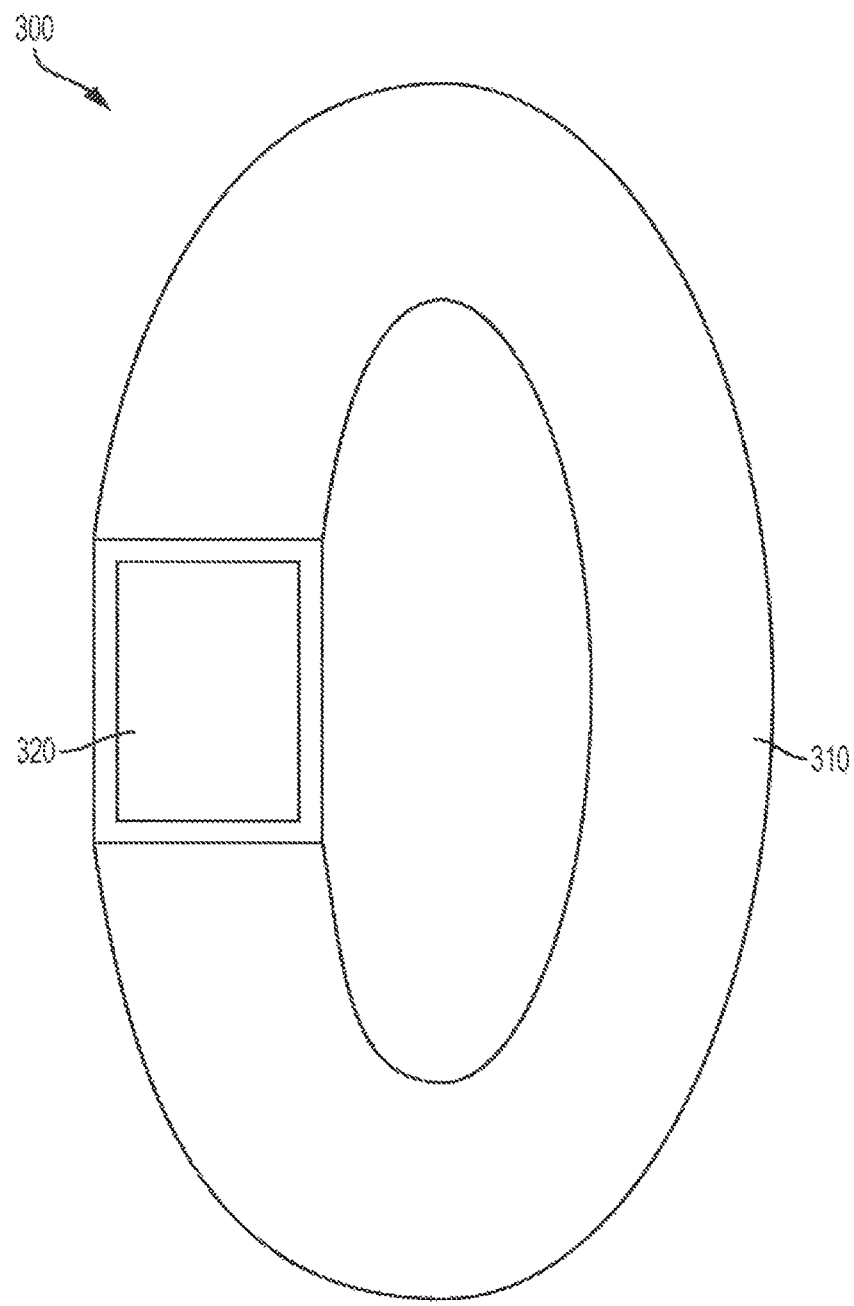
FIG. 3A illustrates a smartwatch that can be used in accordance with the methods and systems for using artificial intelligence to control mobile devices used for presentation and display of mobile device tasks and control mobile devices used for presentation and display of mobile device tasks and applications and enhance presentation and display of augmented reality information with smartglasses or other mobile devices paired or connected to smartglasses, while not reducing visual acuity as presented herein.

FIG. 3A depicts a smartwatch 300 that can be used in accordance with the methods and systems for using artificial intelligence to enhance experiencing augmented reality information described herein. The smartwatch 300 has a wrist band 310 and display 320. The display 320 can be a conventional LCD or LED display, and can include a touchpad or panel.

Figure 3B:
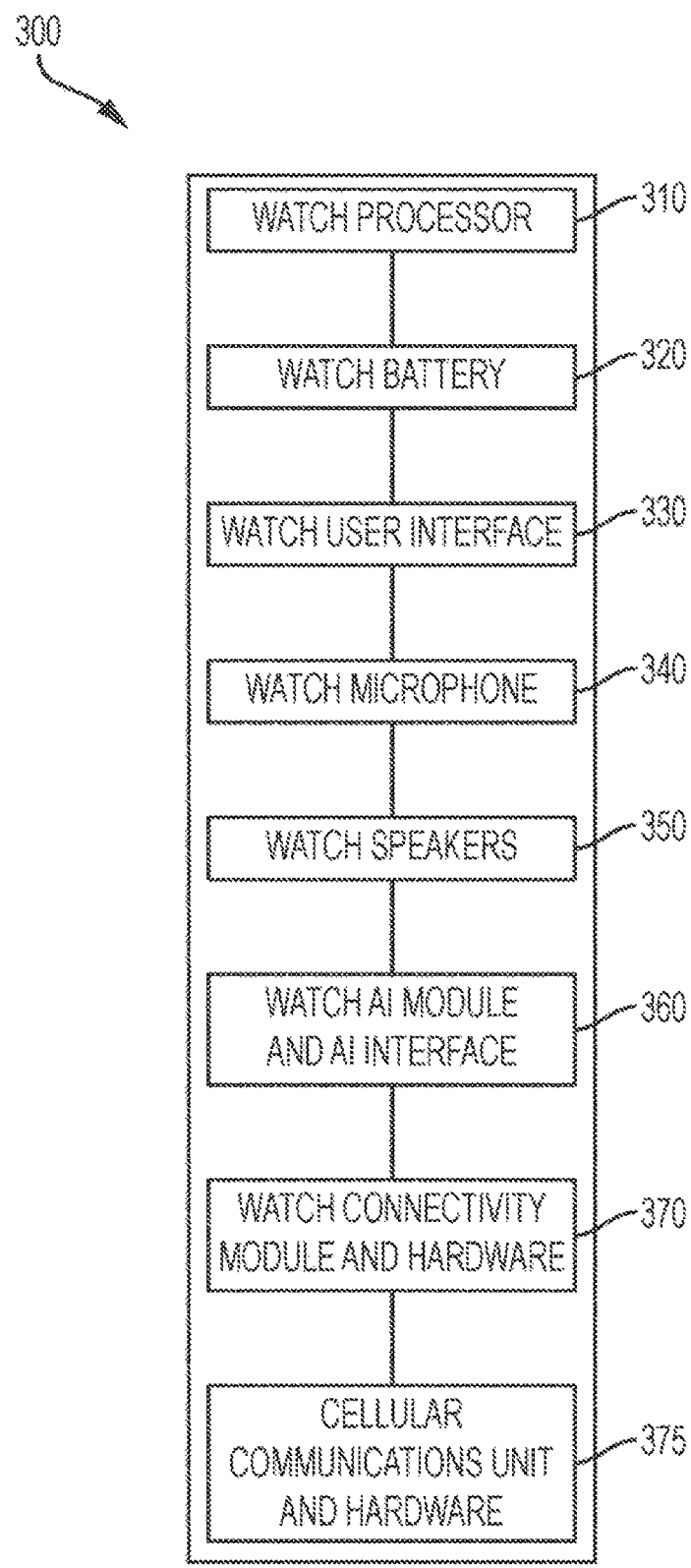
FIG. 3B is a schematic diagram of the smartwatch of FIG. 3A.

FIG. 3B is a schematic diagram of components and modules of smartwatch 300 that can include watch processor 310, battery 320, watch user interface 330, watch microphone 340, watch speakers 350, and watch artificial intelligence (AI) module and interface 360, and smartwatch connectivity module and hardware 370, which may use WiFi, Bluetooth, near field communication, and/or other types of wireless technology standards to pair and/or communicate with other mobile devices, and cellular communications unit and hardware 375, which enables the smartwatch 300 to communicate over the cellular network. Other components of smartwatch 300 not depicted could also be included in the smartwatch 300, such as an accelerometer a GPS chip and memory unit.

Smartglasses 200 can communicate with smartwatch 300 using connectivity module and hardware 260 or cellular communications unit and hardware 275 and either smartwatch mobile application 301 or the optional smartglasses mobile application 201.

Smartglasses 200 can also communicate with smartphone 400 using connectivity module and hardware 260 or cellular communications unit and hardware 275, smartphone connectivity module and hardware 490, cellular communications unit and hardware 495, smartphone mobile application 401 or the optional smartglasses mobile application 201.

Figure 4A:
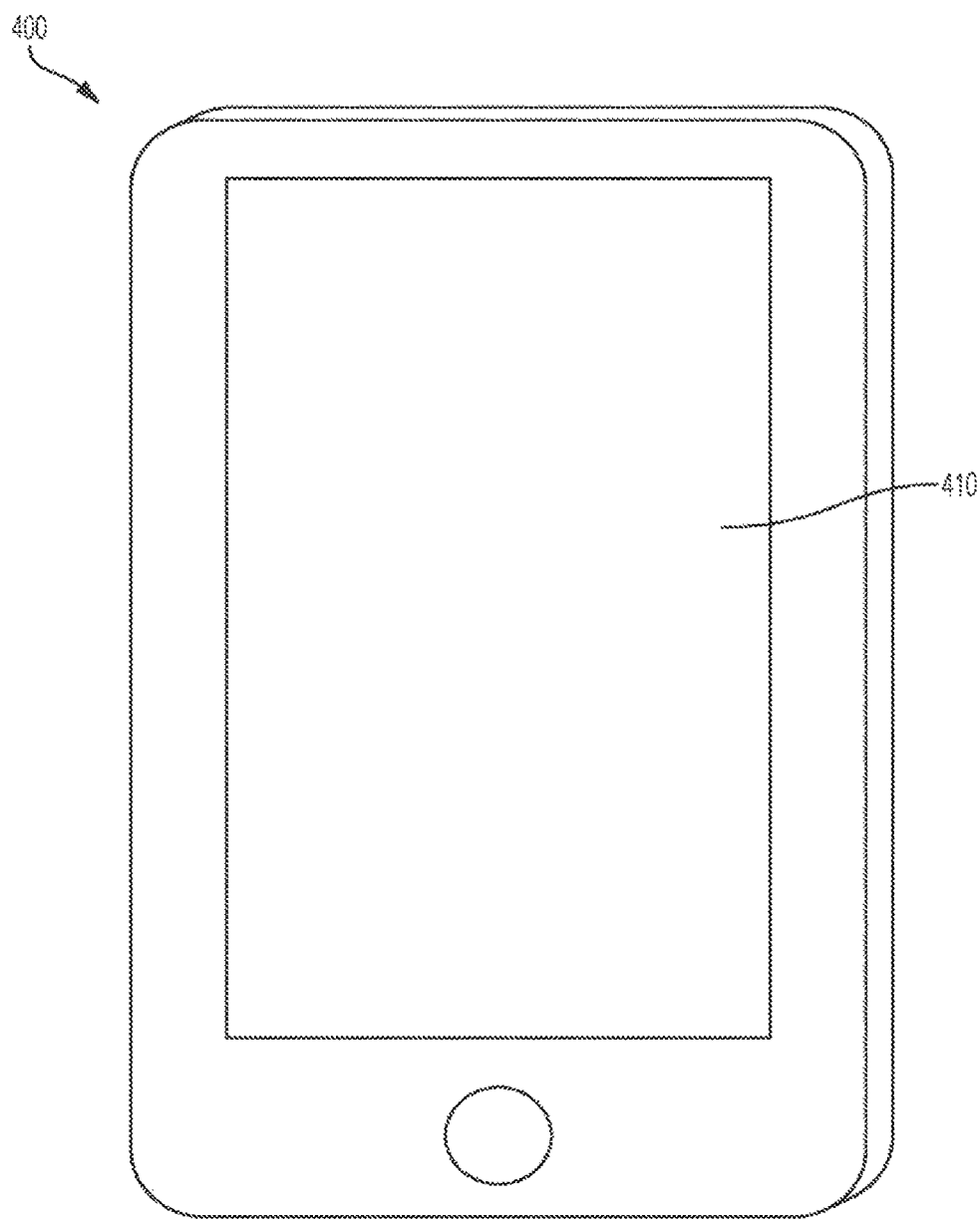
FIG. 4A illustrates a smartphone that can be used in accordance with the methods and systems for using artificial intelligence to control mobile devices used for presentation and display of mobile device tasks and control mobile devices used for presentation and display of mobile device tasks and applications and enhance presentation and display of augmented reality information with smartglasses or other mobile devices paired or connected to smartglasses, while not reducing visual acuity.

FIG. 4A depicts a smartphone 400 with smartphone display 410 that can optionally be used in accordance with the methods and systems for using artificial intelligence to enhance experiencing augmented reality information described herein. The display 410 can be a conventional LCD or LED display, and can include a touchpad or panel.

Figure 4B:
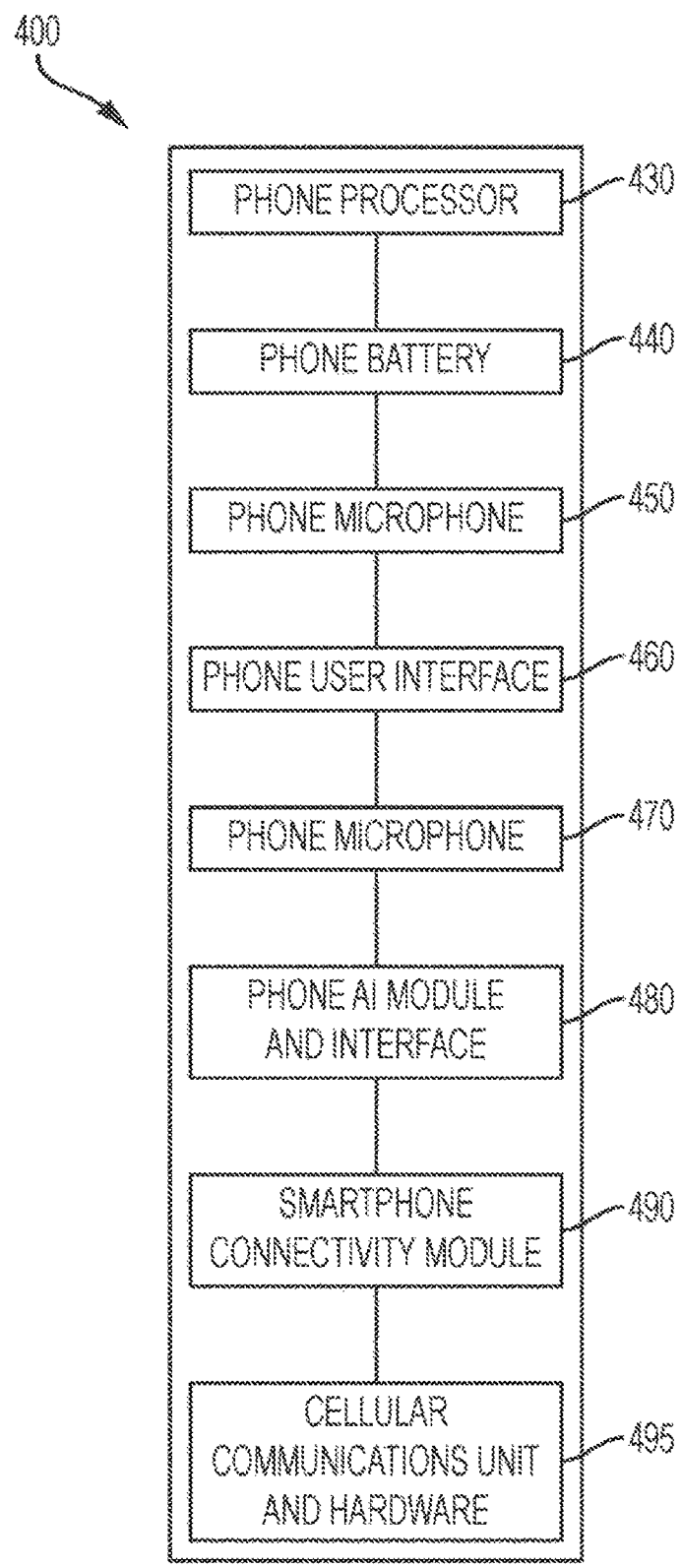
FIG. 4B is a schematic diagram the smartphone of FIG. 4A that can be used in accordance with the methods and systems for using artificial intelligence to control mobile devices used for presentation and display of mobile device tasks and control mobile devices used for presentation and display of mobile device tasks and applications and enhance presentation and display of augmented reality information with smartglasses or other mobile devices paired or connected to smartglasses, while not reducing visual acuity described herein in accordance with the inventions described herein.

FIG. 4B is a schematic diagram of components and modules of smartphone 400 that can include phone processor 430, phone battery 440, phone microphone 450, phone user interface 460, phone speakers 470, phone artificial intelligence (AI) module and interface 480, and smartphone connectivity module and hardware 490, which may use WiFi, Bluetooth, near field communication, and/or other types of wireless technology standards to pair and/or communicate with other mobile devices, and cellular communications unit and hardware 495, which enables the smartphone 400 to communicate over the cellular network. Other components and modules also can be included in smartphone 400, such as a GPS chip, memory, and an accelerometer.

Figure 5:
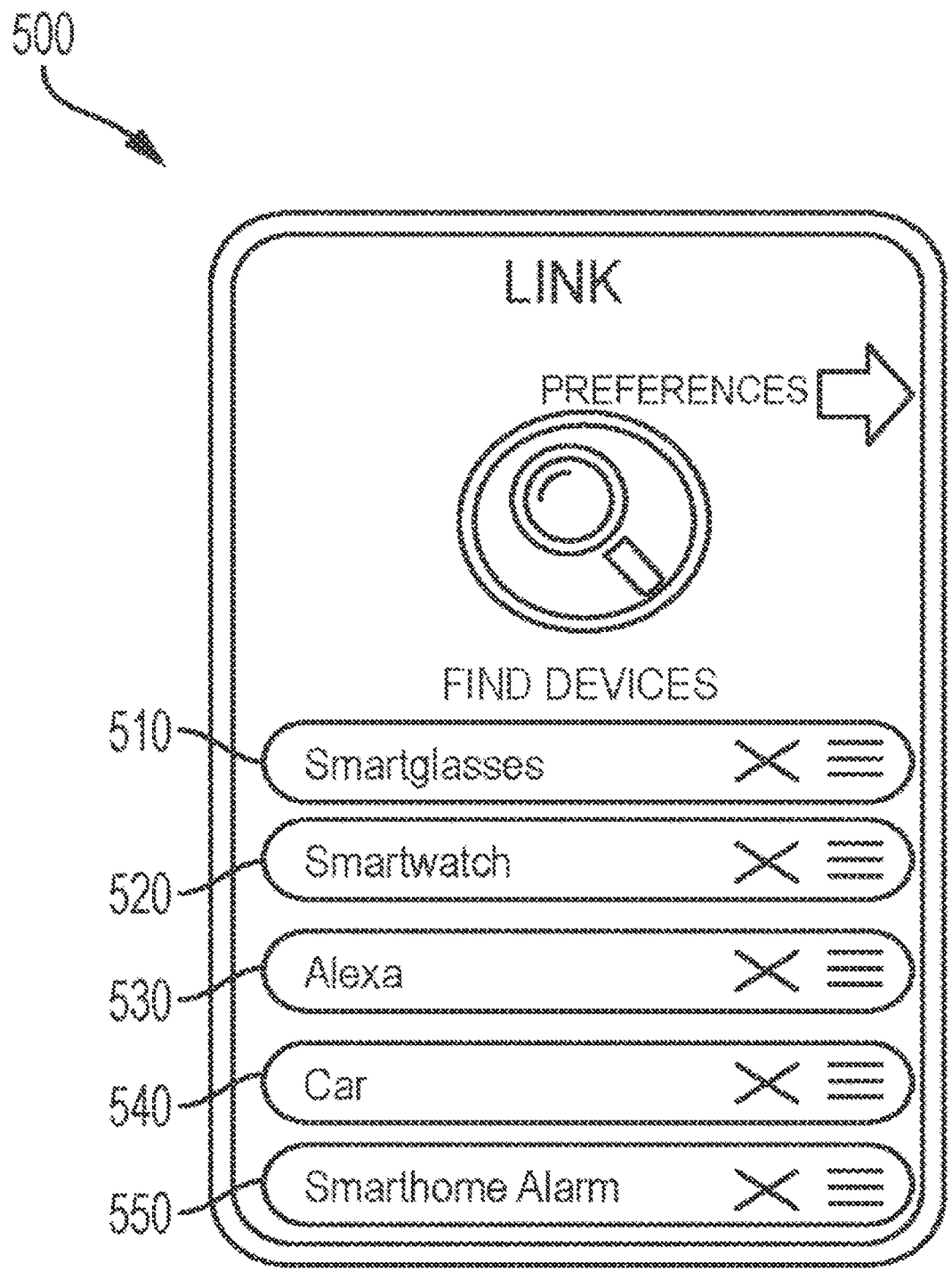
FIG. 5 illustrates an exemplary connection manager screen that can be used to pair and connect smartglasses, a smartwatch, or smartphone, or other devices for using artificial intelligence to control mobile devices used for presentation and display of mobile device tasks and control mobile devices used for presentation and display of mobile device tasks and applications and enhance presentation and display of augmented reality information with smartglasses or other mobile devices paired or connected to smartglasses, while not reducing visual acuity described herein in accordance with the inventions described herein.

FIG. 5 illustrates a connection manager screen that can be used to accept input commands to pair and connect smartglasses, a smartwatch, or smartphone to each other enhance experiencing augmented reality information described herein in accordance with the inventions described herein. The connection manager screen can be presented on one or all of smartglasses 200 by smartglasses mobile application 201, smartwatch 300 by smartwatch mobile application 301, and smartphone 400 by smartphone mobile application 401.

Screen 500 depicts devices that can be connected or paired. In this example, the screen is presented on smartphone 400, but it also could be presented on smartglasses 200 or smartwatch 300.

Screen 500 shows all devices in range, smartglasses 510 and smartwatch 520, Alexa 530, car 540, and smart home alarm 550. Many other devices also could be paired or connected. Selecting smartglasses 510 and smartwatch 520, for example, will pair or connect those devices to the smartphone 400.

A user can select X to "forget" a device. Typically, only two devices can be supported at a time, so the top two devices will generally be "active" priority and will push out all other devices to connect when in range. When the user's main device can support more Bluetooth connections, such as when a smartphone is in use, the device mobile application controlling display and presentation of mobile device tasks and applications should activate additional connections with subsequently lower priority until the device's capacity is reached. There is no limit to the number of devices that can be remembered by the connection manager screen 500. Devices can be renamed by using a long press, for example.

In addition to securing a stable connection among smartphone 400 and his other wearable devices, smartglasses 200 and smartwatch 300, and providing the ability to adjust display and input preferences among these devices, the smartglasses mobile application 201, smartwatch mobile application 301, and smartphone mobile application 401 will also be able to connect to other compatible systems.

For example, a smart home which is controlled by a tablet, with the ability to turn on lights, heating air conditioning remotely. The smartglasses mobile application 201, smartwatch mobile application 301, or smartphone mobile application 401 (depending upon which device's mobile application is used to control task or application operations among the devices) could be prompted to connect to smart home appliances and other devices once entered (disconnecting from other devices if needed). Once connected, the lights and air could be controlled by a tap of a button on the smartwatch 300, smartphone 400, or simply via a vocal command through the smartglasses 200.

The smartglasses 200 connectivity module and hardware 260 and cellular communications unit and hardware 275 and smartglasses mobile application 201, smartwatch mobile application 301, smartwatch connectivity module and hardware 370 and cellular communications unit and hardware 375, smartphone mobile application 401, smartphone connectivity module 495, and smartphone cellular communications unit and hardware 495 can facilitate transmission of data between those mobile devices and help realize the potential of wearable devices used in concert, mitigating their individual limitations.

TABLE 1

| LINK App Use Case | Visual Data (WATCH) | Audio Data (GLASSES) | Both |
|---|---|---|---|
| SMS Messaging | In & Out (display texts, type texts) | Opt In & Out (hear texts, dictate texts) | Opt (eg, hear a text and type a response) |
| Dialing/Receiving Call | Opt In & Out (Dial via contacts list, call back) | In & Out (Siri call initiation, LOUD touchpad answering) | Opt (eg, dial off WATCH and talk with GLASSES) |
| Notifications | Out (display push notes) | Opt Out (Hear push notes) | No unless preference |
| Nav | Opt In & Out (type address, display arrow) | In & Out (Siri nav initiation and hear directions) | Opt ("tell me and show me how to get there") |
| Games | In & Out (display game watch touch control) | Opt Out (game sound) | Opt (sound can be WATCH or GLASSES) |
| LCD Token Wallet | Opt In & Out (Open app and send tokens) | Opt In & Out (Audio alerts about token price etc) | Opt (See visual confirmation of vocal transaction) |
| Weather | Opt In & Out (enter ZIP see charts) | Opt In & Out (say city, hear temp) | Yes (See and hear info simultaneously) |
| Stocks | In & Out (charts, add ticker) | Opt Out (hear price alerts) | Opt (add tickers vocally) |
| Watch Dating Apps | In & Out (Enter bio, swipe profile) | No (unless speech to text through GLASSES) | Opt (Vocally swipe) |
| Video | Out | Out | Opt (Playback controls from WATCH or GLASSES) |
| Music | Opt In & Out (see library) | In & Out (voice-select song, hear music) | Opt (hear songs as you browse) |
| App Store | In & Out (navigate menus) | No (unless voice-select app download) | Opt (Vocal navigation of WATCH interface) |
| Camera | In & Out (Read codes, display viewfinder) | No (unless audio control of shutter desired) | No unless preference |
| Siri/Alexa/Bixby | Opt Out (display AI speech as text) | In & Out (Voice control and answers) | Opt (Can be done easily on GLASSEs alone) |
| Notes | In & Out | In (speech recognition) | Opt ("Read that back to me") |
| Voice Memo | Opt In & Out (display library) | In & Out | Opt (Display timer on WATCH) |
| Calculator | In & Out | Opt In & Out via Siri | Opt (Visual representation of spoken queries) |
| Clock/Stopwatch | In & Out | Opt In & Out (set stopwatch/hear time) | Opt (Control stopwatch/snooze with voice) |

TABLE 1-continued

| LINK App Use Case | Visual Data (WATCH) | Audio Data (GLASSES) | Both |
| --- | --- | --- | --- |
| Venmo | In & Out | Opt In & out via Siri | Opt (Visual confirmation of vocal transaction) |
| Watch OS Apps | In & Out | Opt Out (audio and voice commands where applicable) | Opt |
| Real Time Translation | In & Out (scan text, display translated) | Opt In & Out (picks up nearby speech, translates) | Opt (WATCH translates speech from GLASSES) |

The first column of Table 1 specifies tasks typically performed on mobile devices that can be enhanced by wearable peripherals. The second column describes the ways information can flow to and from smartwatch 300 whether the user can receive relevant data about the task from the smartwatch 300 (Out), and whether user input for the task is possible on the smartwatch 300 (In). The third column similarly describes the flow of input and output between the user and smartglasses 200. The fourth column shows when there is potential synergy between the smartwatch 300 and smartglasses 200 for the task. A mark of Optional (Opt) indicates that the user could choose whether or not to use the particular device for a task, and could select their preference in a settings panel within the mobile applications 210, or 310. An absence of the Opt mark can indicate that this would likely be the default setting for the task, or required to perform the task off-phone. When starting the task the mobile application 201, smartwatch mobile application 301, or smartphone application 401, whichever device mobile application controls what device is used for different tasks) would then engage the user's default wearable device(s) for relaying input and output to the smartglasses 200, smartphone 400, or smartwatch 300.

Various embodiment connectivity module implementations may be programmed and configured to permit setting priority of wifi networks, and to manage and prioritize all types of wireless connections to a main device, including Bluetooth connections. In an illustrative example, an embodiment implementation may be programmed and configured to provide a selection slider on a prioritizer interface permitting a user to change the type of connection being organized (for example, Bluetooth, wifi, near field communication, and the like). Some embodiments may be programmed and configured to permit setting priority and managing and prioritizing all types of wireless connections using voice commands to change connection type or network within connection type or override settings.

Smartwatch 300 can be used to both display and type SMS texts. Smartglasses 200 can chime when a text is received, and vocalize the text. Speech to text utility of AI software such as Siri, Bixby or Alexa can be used to send messages from smartglasses 200. There are many different configurations where either or both smartglasses 200 and smartwatch 300 can be used for the task, and the smartglasses mobile application 210 helps manage this. For example, one could set a preference on the settings panel of device the mobile application controlling task device preferences, to have incoming messages appear on the smartwatch, but activate AI in the smartglasses 200 to dictate a response.

Taking and making phone calls can be done hands free with smartglasses 200 alone, so this could be a default setting. However, the user may also want visual information such as call duration and signal strength, which could appear on the smartwatch 300 by issuing an override command. Similarly, if the smartwatch 300 has the capability, the user could select to take calls on it alone.

Push notifications, since they are often large in number, are most practically displayed on smartwatch 300. However, the user could elect to have their notifications vocalized in smartglasses 200.

Navigation application use is potentially safer when done through smartglasses 200 alone, as it does not draw attention in the same way as a traditional GPS or map application. However, a user could elect to also display the next turn, miles to destination or other useful information on the smartwatch 300. In the case of cycling, directions solely on the smartwatch 300 could be ideal. This is another case where many different control and display configurations are possible via the device mobile application controlling the device used for a particular task. In the case of games, the user could elect whether to play the sound through the smartglasses 200. The smartwatch 300 could also be used an auxiliary display or game controller to the smartphone 400.

In the case of a wallet application, the user could access it via a smartglasses 200 or smartwatch 300, or both. Dual layer security features could be enabled, requiring multiple devices to unlock an account.

For a weather application, the user could easily gain advantage from both smartglasses 200 and smartwatch 300 in tandem. The user could dictate their postal code to the smartglasses 200, hear a brief weather report, and see crucial statistics on the smartwatch 300.

Due to the importance of visual data in stocks, the smartwatch 300 would be likely be preferred for most stock quote applications. However, pricing alerts and other useful functions could be relayed in the smartglasses 200.

For dating applications, a user could swipe profiles on the smartwatch 300, or see profiles on the smartwatch 300 and swipe with their voice through the smartglasses 300. Some dating applications provide the ability to call another party, which could be done on the smartglasses 300 for comfort.

Video sound can be played on smartwatch 300 and/or smartglasses 200, and playback controlled from either device.

For music listening applications, a music library could be accessed from either device, and have sound play on either device. The smartglasses 200 may be more comfortable for playback.

For an app store application, a visual representation is likely best viewed on smartwatch 300. However, simple oral commands like "show me what's trending" could be done through the smartglasses 200, with the result displayed on the smartwatch 300.

For a camera application, there is not much function for smartglasses 200 without a camera, except remotely capturing images from smartphone 400.

For AI systems, it would be preferable that the smartglasses 200 should be the default device stored the lookup tables. Many of the light tasks we need our mobile devices to do can be done on the smartglasses 200 alone. However, the smartwatch 300 could also display answers and be used to start and cancel vocal inquiries. Notes can be typed or dictated depending on the user's preference. Smartglasses. The smartglasses mobile application 210 can engage the user's preferred device when "take a note" command is given.

Voice memos are best performed with the smartglasses 200, but a visual list of notes displayed on the smartwatch 300 can also be useful.

Calculations on a calculator application better lend themselves to the smartwatch 300, unless it is particularly simple arithmetic easily done by the AI of the smartglasses 200.

An alarm can be shut off by voice on either device. This is a highly flexible task.

For instant payment applications, payments can be initiated and confirmed on either or both devices.

Smartglasses microphone and speakers can be used to augment smartwatch applications. There is some flexibility in using language translation applications as well. A watch could scan foreign language words, and relay vocal information via the smartglasses mobile application 201 to the smartglasses 200. Likewise, foreign words can be spoken into the smartglasses 200, and a native translation could appear on the smartwatch 300.

There are many use cases where both smartwatch 300 and smartglasses 300 working together can improve the mobile computing experience. The device mobile application controlling the devices used for particular tasks (whether the smartglasses mobile application 201, smartwatch mobile application 301, or smartphone mobile application 401) rationalizes the flow of information between paired or connected devices, by providing a way to make the experience better fit individually.

The mobile application used to facilitate control of the device for displaying and presenting information will leverage voice control developer tools and smartphone AI systems such as Siri®, Bixby® or Alexa® wherever possible to help improve the experience of various applications. The mobile application controlling the devices used for particular tasks should essentially run in the background, increasing the ease of which the user goes about their typical tasks.

The mobile application controlling the devices used for particular tasks can be programmed to have preset priorities for display of augmented reality information that depend upon the application being used with the smartglasses. These preset priorities can be set using optional smartglasses mobile application 201, smartwatch mobile application 301, or smartphone mobile application 401 and stored in lookup tables accessible with those mobile applications. The lookup tables can contain defaults that will select the device on which AR information is viewed or heard based on what device would typically be best suited to view or hear that output.

Figure 6:
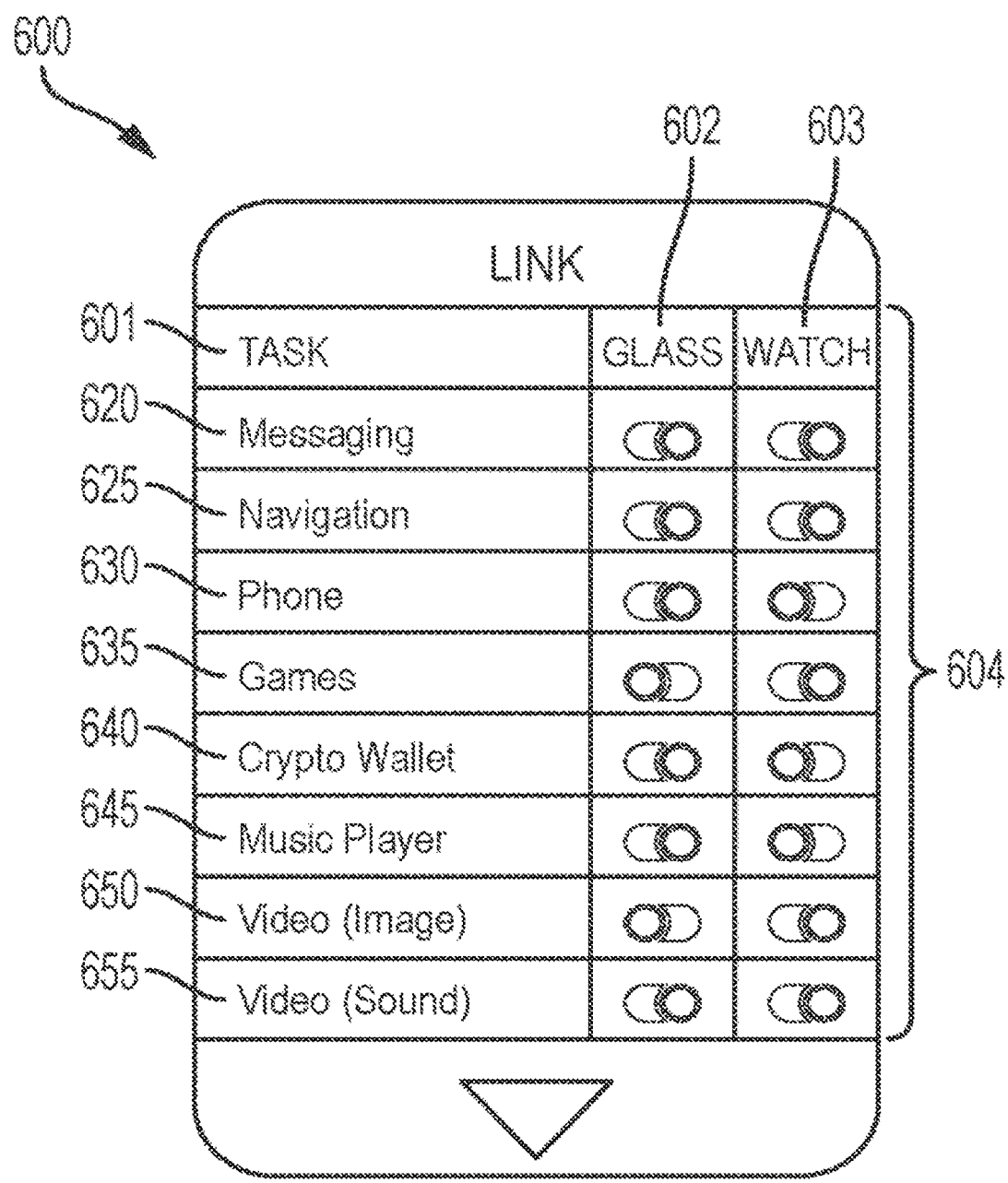
FIG. 6 illustrates an exemplary control panel screen to manage the input and output of data between a paired or connected smartglasses, smartwatch, and smartphone for using artificial intelligence to control mobile devices used for presentation and display of mobile device tasks and control mobile devices used for presentation and display of mobile device tasks and applications and enhance presentation and display of augmented reality information with smartglasses or other mobile devices paired or connected to smartglasses, while not reducing visual acuity described herein in accordance with the inventions described herein.

FIG. 6 depicts an example of a control panel screen that can be used to set defaults for different tasks in which smartglasses 200, smartwatch 300, smartphone 400 or combinations thereof, including both, can be used. The control panel can be accessed from whichever device is set to control the devices used for particular tasks using a mobile application on the particular controlling device.

Screen 600 shows a task column 601 with corresponding columns for 602 smartglasses 200, 603 for smartwatch 300, and 604 for both devices, with setting buttons to manage device inputs and outputs. Tasks include 610 messaging, 620 navigation, 630 phone, 635 games, 640 crypto wallet, music player 645, video (Image) 650, video (Sound) 655. Other configurations and tasks could be included. The default settings can optionally be stored in lookup tables residing in memory or on mobile applications.

When the device mobile application controlling display and presentation of tasks and applications is actively open, it automatically prepares all connected devices to receive all applicable forms of user input to navigate its interface. For example, when device mobile application controlling display and presentation of tasks and applications is a smartwatch mobile application, it can receive all applicable forms of input to its interfaces. For example, interface screens can be fluidly navigated through voice commands received from connected or paired smartglasses 200.

Figure 7:
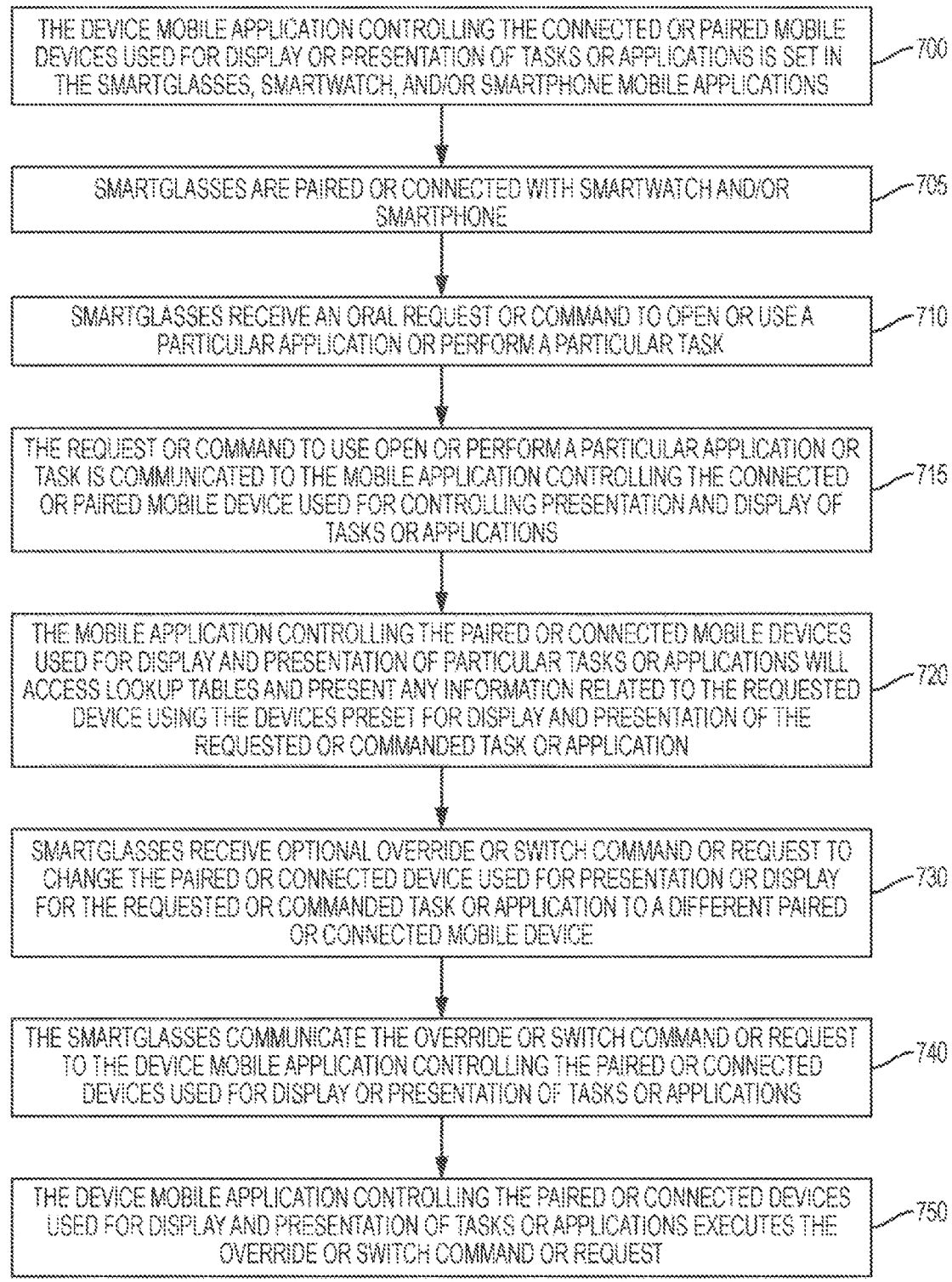
FIG. 7 is a flowchart illustrating methods for using artificial intelligence to control mobile devices used for presentation and display of mobile device tasks and control mobile devices used for presentation and display of mobile device tasks and applications and enhance presentation and display of augmented reality information with smartglasses or other mobile devices paired or connected to smartglasses, while not reducing visual acuity, as described herein in accordance with the inventions described herein.

FIG. 7 is a flowchart depicting a method for using artificial intelligence to control mobile devices used for presentation and display of tasks and applications enhance experiencing augmented reality information using smartglasses. This method can also be used to override the preset priorities for display. Steps need not necessarily be performed in the precise order presented here. Variations will be apparent to those skilled in the art.

At step 700, the device mobile application controlling paired or connected devices used for display or presentation of tasks or applications is set either in the smartglasses mobile application 201 or the smartwatch mobile application 301, and/or smartphone mobile application 401.

At step 705, smartglasses 200 are paired or connected with smartwatch 300 and/or smartphone 400 using smartglasses connectivity module 260, cellular communications unit and hardware 275, smartwatch connectivity module 370, and/or smartphone connectivity module 490, and cellular communications unit and module 495.

At step 710, the microphone 225 of smartglasses 200 and smartglasses AI interface 280 receive an oral request or command audibly proceeded by language, such as "tell me" or "show me," that is communicated to glasses' AI interface 280. Examples of questions can include questions designed to perform tasks, open applications, including map or navigation, music, wallet, application store, calculator, watch, stopwatch, banking or money transfer, video, games, stocks, weather, etc.

At step 715, the request or command will be communicated to the device mobile application controlling connected or the paired mobile device used for display or presentation of tasks and applications. If that mobile application is not smartglasses mobile application 201, the request will be communicated to the device mobile application controlling display and presentation of tasks and applications via smartglasses At step 720, the mobile application controlling the paired or connected devices the devices used for particular tasks or applications will access lookup tables and present or display information related to the requested task or application using the paired or connected devices (smartglasses, smartphone, or smartwatch) preset to view or hear that information.

The mobile application controlling the paired or connected mobile devices used for particular tasks or applications can be smartglasses mobile application 201, smartwatch mobile application 301, or smartphone mobile application 401.

At step 730, the smartglasses 200 microphone 225 and smartglasses AI interface 280 may receive an optional override or switch command to override the information in the lookup tables with specific commands to display information on a different paired or connected device, i.e., the smartglasses 200, smartwatch 300, or smartphone 400 using an oral override or switch command to override settings in the lookup table.

At step 740, the smartglasses 200 communicate the override or switch request or command to the device mobile application controlling the paired or connected devices used for display or presentation of tasks or applications.

At step 750, the device mobile application controlling the paired or connected devices used for display or presentation of tasks or applications executes the override or switch command or request.

The ability to override lookup table preset defaults and switch the paired or connected mobile device used for display and presentation of information related to a requested or commanded task or application will provide flexibility and control to enhance perception of AR information.

Smartglasses mobile application 210 increases the utility of smartglasses 200 and smartwatch 300 and of wearing them in tandem via an easy-to-use software applications. When carrying a smartphone 400 to supply a wearable device with an Internet signal, highly complex interface and processing power may no longer be necessary, it could be adapted to the native software ecosystem of a smartwatch 300 or smartglasses 200.

Smartglasses mobile application 210 will facilitate transmission of data between mobile devices and their users. It will help realize the potential of wearable devices used in concert, mitigating their individual limitations.

Smartglasses mobile application 210 also has several unique applications in the facilitation of cryptographic transactions. The first is the ability to authorize cryptographic (cryptocurrency) transactions via wearable smartglasses and smartwatches. This is through user input transmitted through the smartglasses 200 or smartwatch 300 to smartglasses AI interface 280, smartwatch AI module and interface 360, or smartphone AI interface 460, which then causes a particular transactional action to take place in a separate cryptocurrency token wallet application. Device input/output preferences selected in the smartglasses mobile application 210 prime the wearable devices to receive this input, and inform how prompts from the separate token wallet applications are communicated to the user.

For example, one could set their smartglasses 200 to be the preferred device for communication with a cryptocurrency token wallet application, provided the cryptocurrency token wallet application has the necessary tooling to make it compatible smartglasses AI interface 280, smartwatch AI module and interface 360, or smartphone AI interface 460. The user could then initiate an on-blockchain token transfer, check a token balance, and more via their smartglasses 200 alone. The smartglasses could communicate confirmation prompts, balance inquiries etc., back to the user.

The second application in regards to cryptographic currency transactions involves the use of QR codes. When smartglasses 200 or smartwatch 300 contains an embedded camera capable of transmitting visual information to a connected smartphone 400 AI interface 460, then the smartglasses mobile application 210 could assist the user in rapidly reading a QR code containing a cryptocurrency public address (or product information) via one of their wearable devices. Whichever device is preferred by the user can be set in the smartglasses mobile application 210 to manage the input/output flow of such transactions. For example, scanning a QR code with the smartwatch could be set to open an AI-compatible cryptocurrency token wallet application (or traditional banking application) on the smartphone, preparing a transaction to this address. The user could then speak the desired transaction amount into their smartglasses 200, hear a confirmation prompt, speak their consent, and see a visual receipt on the smartwatch 300. In this way the smartglasses mobile application 201 can assist the user in communication with public blockchains. Extrapolating from this function, the smartglasses mobile application 210 could be used to read QR codes in one device, and manage actions on it in another.

A strong application of this function is its potential use in point-of-sale terminals. Should a retailer desire the acceptance of cryptocurrency for transactions, they could simply put out a "paper wallet" containing QR codes of their cryptocurrency addresses. Customers could then scan the wallet at checkout via their desired wearable, confirm payment vocally, then receive their goods and digital receipt. For businesses that can operate solely on cryptocurrency, or at such a time as that becomes a standard form of remittance, this function of the mobile application can almost completely remove point-of-sale hardware and software costs for a retail business. An additional function for cryptographic transactions is the ability to add security layers more suited to, or only possible in wearable devices to cryptographic transactions. For example, a common feature in smartwatches like smartwatch 300 is the ability to read heart rates and other biometric parameters. A cryptocurrency token wallet app could be updated to be sensitive to finger print data or retinal scan data in the unlocking of one's funds based on a unique biometric identifier. The smartglasses mobile application 210 could be set to prime the token wallet application to receive this data from the smartwatch 300. Therefore, a cryptographic transaction could be given secondary verification via the user's finger print. Another example would be unique voice signatures as an additional security layer. The smartglasses mobile application 210 could prepare and send vocal data to a token wallet app for additional identity screening along with other biometric quantities.

An additional property of the smartglasses mobile application 210 is its adaptability to being a discrete AI interface, purpose-built to create a smooth, highly functional and symbiotic user experience among their various wearable devices and smartphones. This would be the most efficient method of data transport between wearables and smartphone applications, as it removes the currently needed intermediary of the smartphone's factory-installed AI in being the gateway for user data from wearables into the smartphone operating system. Adapting the smartglasses mobile application 201 into an AI interface would require the following:

The ability to be the default virtual assistant on the smartphone.

The ability to run in the background in an always-on fashion, even while the phone is locked.

The ability to communicate input/output data between itself, the user, and a variety of applications.

The ability to respond to the "talk" button on wearables, earbuds and Bluetooth headsets.

Figure 8:
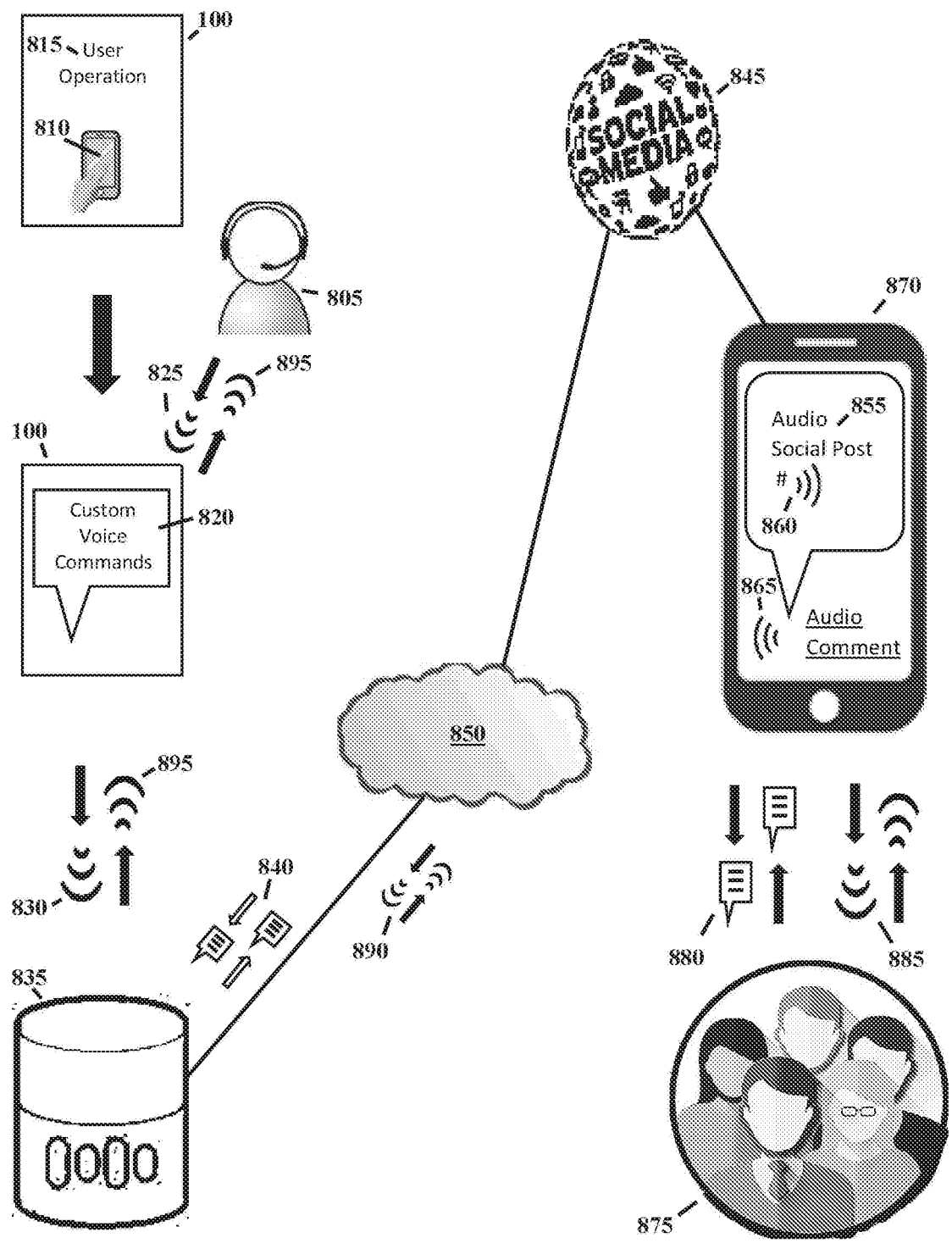
FIG. 8 is an illustrative operational scenario depicting an exemplary web-enabled mobile device operating voice assistant manager software receiving a request for a web-enabled operation, constructing a voice command configured to implement the operation using a device-level voice assistant, and providing a voice indication of the operation result when the voice assistant is activated with the constructed voice command.

FIG. 8 is an illustrative operational scenario depicting an exemplary web-enabled mobile device operating voice assistant manager software receiving a request for a web-enabled operation, constructing a voice command configured to implement the operation using a device-level voice assistant, and providing a voice indication of the operation result when the voice assistant is activated with the constructed voice command. In FIG. 8, the user 805 employs the web-enabled device 100 (depicted at least in FIG. 1) user interface 810 to implement the user operation 815. In the depicted embodiment, the web-enabled device 100 includes an exemplary device level voice assistant manager process implementation (described at least with reference to FIG. 1). Note the web-enabled device could be smartglasses, a smart phone, smart watch, or other web-enabled device, including a tablet or a web-enabled device paired or connected to a main web-enabled device. The device level voice assistant manager process implementation is configured and programmed to receive the request 815 for a web-enabled operation, construct the voice command 820 configured to implement the operation using a device-level VA, and provide a voice indication of the operation result when the VA is activated with the constructed voice command 820. In an illustrative example, the device level voice assistant manager process may be programmed to activate the device level voice assistant to perform an operation requested by the user 805, based on configuring the device level voice assistant with voice commands determined by the device level voice assistant manager process executing on the user's web-enabled device, in response to the operation 815 requested by the user 805 through the user's web-enabled device 100 user interface 810.

The web-enabled device 100 constructs custom voice operation command 820 configured to cause a VA to perform the user requested operation 815 in response to the user voice command 825. The web-enabled device 100 audibly presents the custom voice operation command 820 via audible commands 830 to the VA 835. The custom voice operation command 820 may include the user voice command 825 augmented with one or more operation command parameter uttered by the user 805. For example, the user voice command 825 may be configured to cause the VA 835 to retrieve financial market data from a particular web site, or post a specific audio message to the user's social media. In an illustrative example, the specific data to retrieve or the specific message content to post may be provided by a command parameter. The web-enabled device 100 may add the command parameter to the user voice command 825 to form the custom voice operation command 820 audibly presented to the VA 835 by the web-enabled device 100.

The VA 835 performs the user requested operation 815 encoded by the web-enabled device 100 as custom voice operation command 820. In the depicted example, the user requested operation 815 is a social post 840 to the user's account on the social media platform 845 operably connected through the network cloud 850. The depicted social post 840 includes audio social post 855 with audio hashtag 860 and audio comment 865 accessible via the mobile device 870 to the social media followers 875 of the user 805. In the depicted example, one or more of the followers 875 posts text reply 880 to the audio social post 860. The followers may also interact with the user 805 using audio posts 885 through the social media platform 845, depending on the format, whether audio, or non-audio, preferred or available to the followers 875 for interaction via social media. In any case, in the depicted example, the web-enabled device 100 transforms the follower 875 posts as needed between text 840 or audio interaction 890, providing the user 805 with the follower 875 audio response 895. In the depicted example, the web-enabled device 100 provides the user 805 with the capability to interact verbally in real time through social media platform 845, even when the follower 875 interactions are text-based.

Figure 9A:
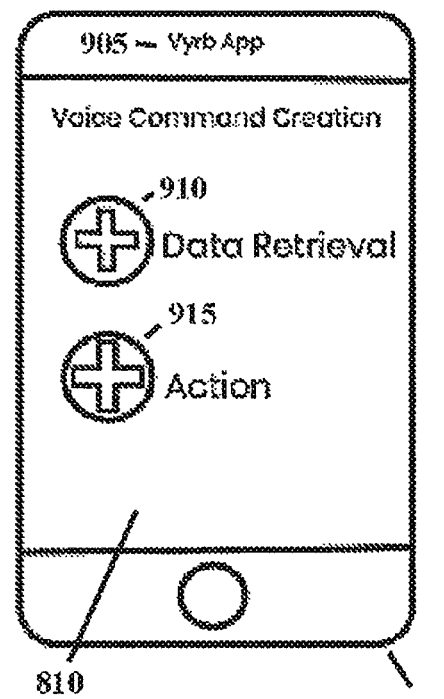
FIGS. 9A-9C together depict an exemplary voice assistant manager mobile app user interface scenario creating an illustrative data retrieval voice command.
Figure 9B:
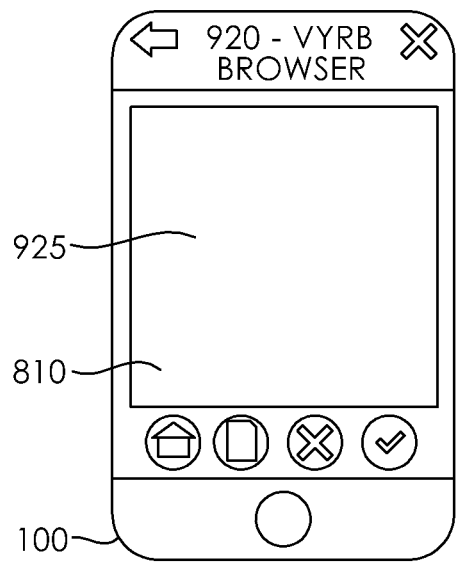
Figure 9C:
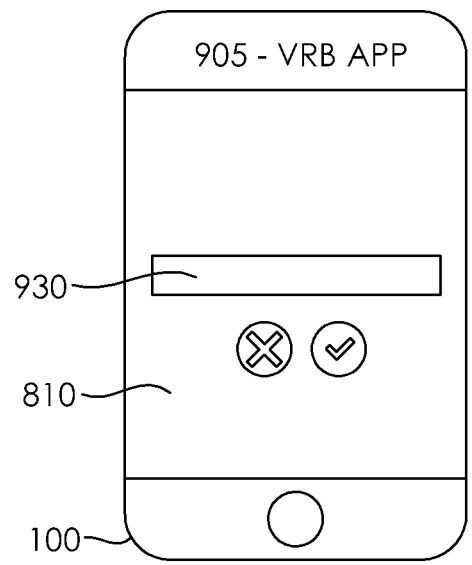

FIGS. 9A-9C together depict an exemplary voice assistant manager mobile app user interface scenario creating an illustrative data retrieval voice command.

In FIG. 9A, the user enters the exemplary Vyrb App 905 user interface 810 configured in the web-enabled device 100 and selects the data retrieval voice command creation 910.

In FIG. 9B, the exemplary web-enabled device 100 user interface enters Vyrb Browser 920 mode permitting the user to explore the web and other apps. The buttons in the browser permit the user to go to the web-enabled device 100 user interface 810 home screen, and draw the fence 925 around an area containing text on a site or app. The user may activate buttons in the browser to cancel or confirm the selection.

In FIG. 9C, the user may enter name 930 for the created data retrieval command. Using an algorithm, the Vryb App 905 then creates a new command with the chosen name, which can be spoken to the device-level voice assistant to retrieve the text in the selected area and vocalize with the device's text to speech engine. The current updated text in the area is retrieved when the command is spoken, so for example the user would receive the present moment's headlines from a news site selection.

Examples of Data Retrieval commands created with Vyrb for use with a device-level voice assistant include: crawling a news site for real-time headlines; crawling a financial app for updated asset prices; Selecting the top of your inbox in a mail app to have the subject lines of recent emails read out; and, Selecting an area in a political polling site to have latest polling data read out.

Figures 10A, 10B, 10C:
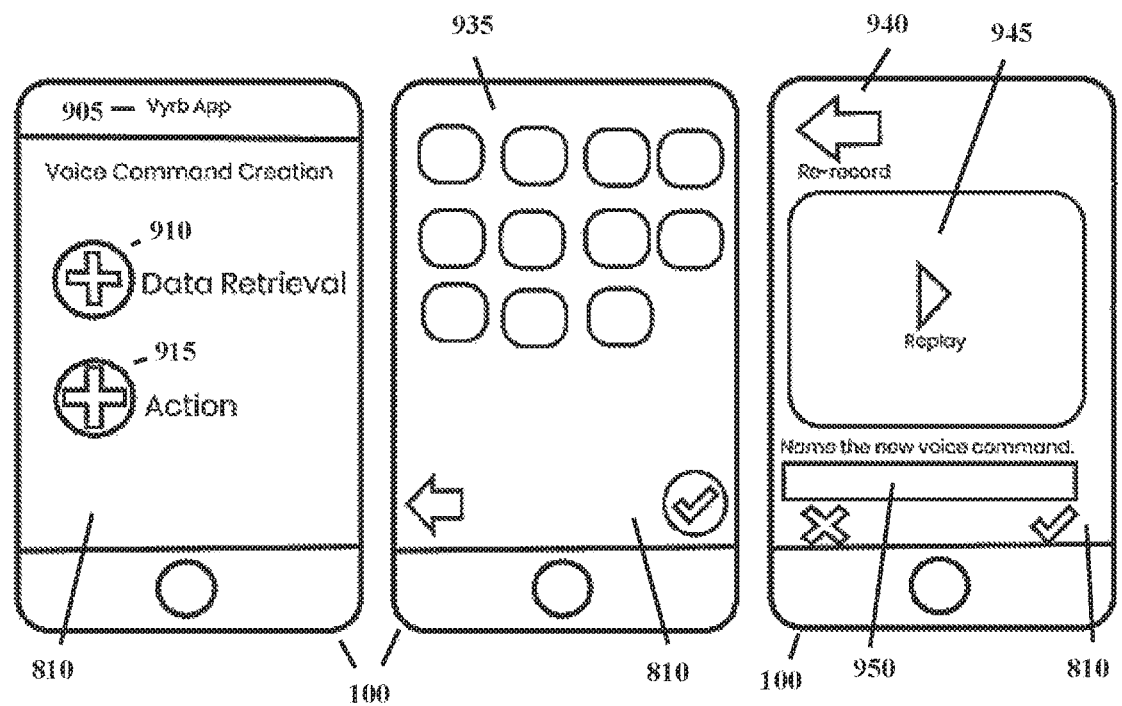
FIGS. 10A-10C together depict an exemplary voice assistant manager mobile app user interface scenario creating an illustrative action voice command.

FIGS. 10A-10C together depict an exemplary voice assistant manager mobile app user interface scenario creating an illustrative action voice command.

In FIG. 10A, the user enters the exemplary Vyrb App 905 user interface 810 configured in the web-enabled device 100 and selects the action voice command creation 915.

In FIG. 10B, the Vyrb App minimizes and displays the device home screen 935. The Vyrb App begins recording user actions on the device, including taps and keystrokes. When the desired action(s) have been performed, the user can hit an overlaid check button to complete the recording.

In FIG. 10C, the user may activate the re-record button 940 to record the operation again, or activate the replay button 945 to replay the operation. The user may provide name 950 for the recorded operation. The Vyrb App algorithm will then create a new voice command for the device-level voice assistant with the name 950. Triggering the command will then cause the Vyrb App to perform the recorded actions as if the Vyrb App were the user. For example, apps may be configured with particular coding to enable them to be interacted with by device-level voice assistants such as Google Voice or Siri. The present methods describe a new user capability, that of being able to add to this interaction code by defining particular web or app data to be collected and verbalized through the voice assistant, or particular user action(s) to be performable by the Vyrb app via a command to the voice assistant. The user defines the name of the data selection or action(s) during command creation, and this name then becomes the voice command itself. For example, a voice command created in this way might look like: "Siri, Vyrb CNN". Then the user's selected area of CNN headlines will be found by the app, then vocalized to the user through the voice assistant's native text-to-speech engine.

Examples of Action commands created for use with device-level voice assistant include: Sending a pre-written text message or email to a particular recipient; Creating a buy or sell order for a particular asset such as Apple stock or Bitcoin; Sending a pre-selected amount of funds to a particular recipient through an app such as Cashapp; and, changing a deep-menu device setting such as sound equalizer settings.

Figure 11:
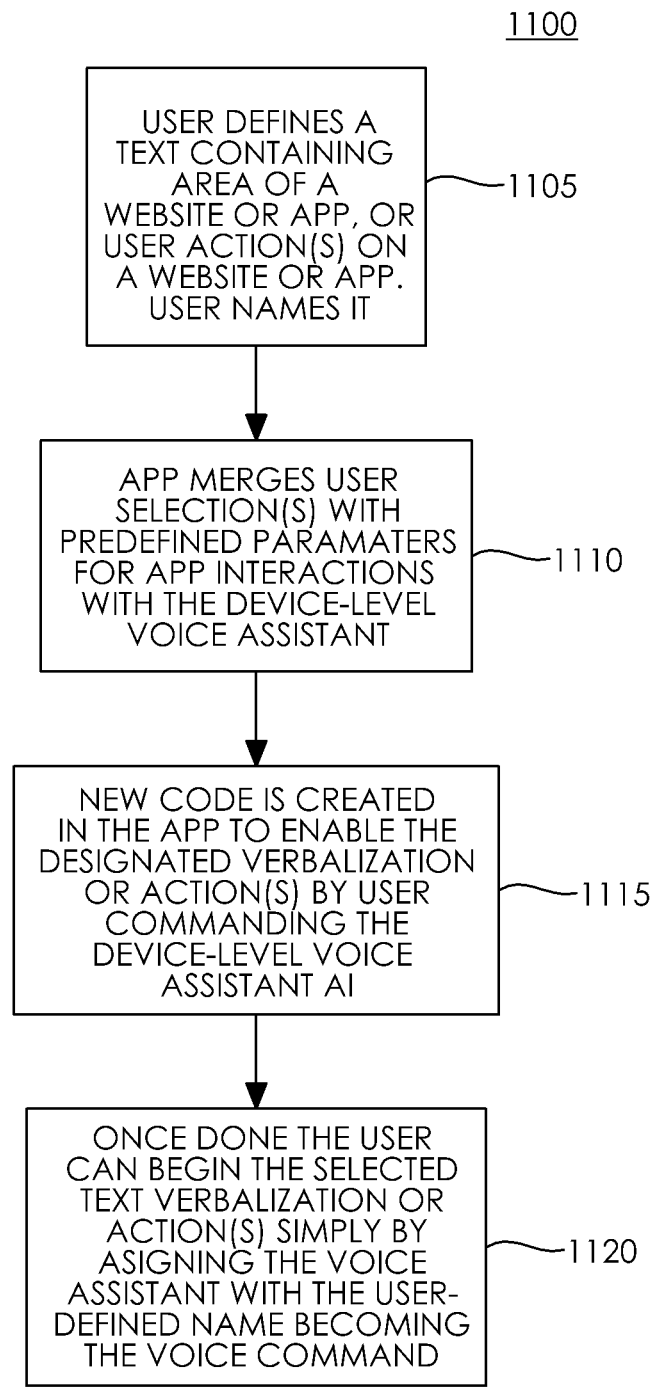
FIG. 11 depicts a process flow of an exemplary device-level voice assistant manager process creating a new voice command for a device-level voice assistant via a visual interface of the application.

FIG. 11 depicts a process flow of an exemplary device-level voice assistant manager process creating a new voice command for a device-level voice assistant via a visual interface of the application. In FIG. 11, at 1105 the user defines a text-containing area of a website or app, or user action(s) on a website or app, and the user names the voice command. At 1110, the app merges the user selection(s) with predefined parameters for app interactions with the device-level voice assistant. At 1115, new code is created in the app to enable the designated verbalization or action(s) by the user commanding the device-level voice assistant AI. At 1120, once done, the user may begin the selected text Verbalization or action(s), by verbally asking the voice assistant, with the predefined name becoming the name of the voice command.

Figure 12A:
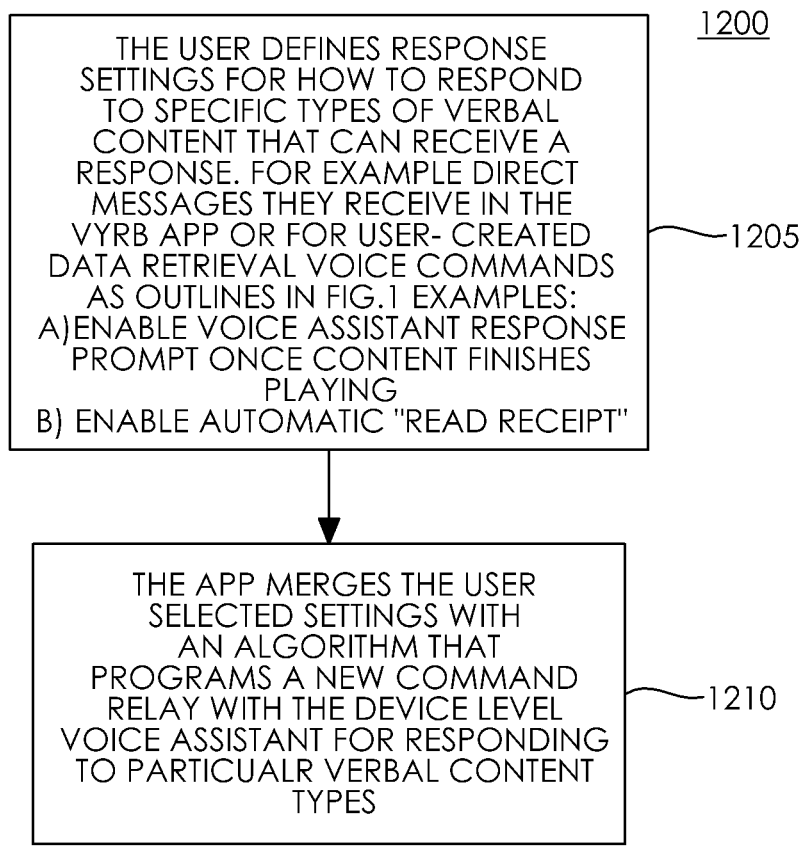
FIGS. 12A-12B together depict a process flow of an exemplary device-level voice assistant manager process implementing verbal commenting via a device-level voice assistant based on pre-selected application settings.
Figure 12B:
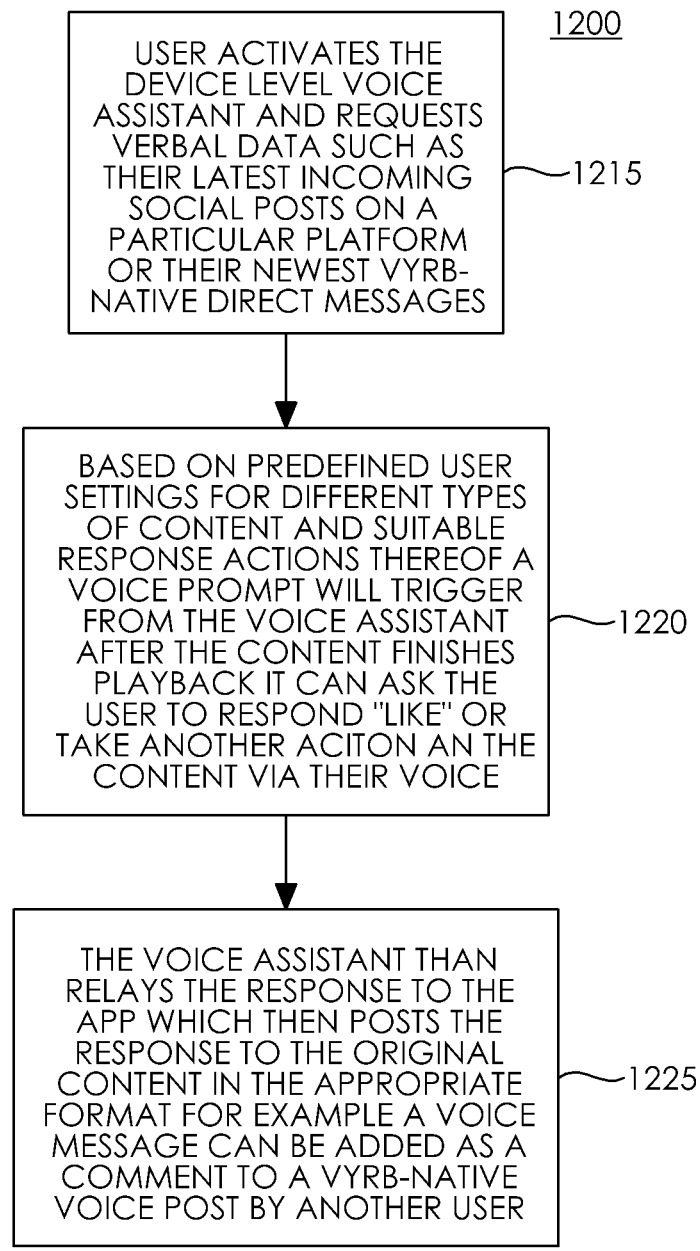

FIGS. 12A-12B together depict a process flow of an exemplary device-level voice assistant manager process implementing verbal commenting via a device-level voice assistant based on pre-selected application settings.

In FIG. 12A, response prompt creation begins at 1205 with the user defining response settings for how to respond to specific types of verbal content that can receive a response. For example, direct messages received in the Vyrb App, or for user-created data retrieval voice commands, such as: enabling a voice assistant response prompt once content finishes playing, or enable an automatic "read receipt." At 1210 the app merges the user selected settings with an algorithm that programs a new command relay with the device-level voice assistant for responding to particular verbal content types.

In FIG. 12B, verbal commenting continues at 1215 with the user activating the device-level assistant, and requests verbal data, such as their latest incoming social posts on a particular platform, or their newest Vyrb-native direct message(s). At 1220, based on predefined user settings for different types of content and suitable response actions thereof, a voice prompt will trigger from the voice assistant after the content finishes playback, and can ask the user to respond "like," or take another action on the content via the user's voice. At step 1225 the voice assistant then relays the response to the app, which then posts the original content in the appropriate format. For example, a voice message may be added as a comment to a Vyrb-native voice post by another user.

In illustrative examples, Verbal Commenting may include: The user requests their five newest inbound Vyrb posts through the device-level voice assistant. After each post is read out, the voice assistant prompts the user if they would like to leave a voice comment. If the user says yes, they record a comment, which the voice assistant transfers to the app and the app then posts it. Then the voice assistant continues to read out the next requested post; the user requests a read-out of their Facebook feed via Vyrb through the device-level voice assistant, and after each post is read out, the voice assistant prompts the user to ask if they want to "like" the post; and, the user receives a notification for an incoming voice message from the Vyrb app. After opening the notification, the app plays the message. Then the app automatically initiates a voice prompt for responding to the message. The app then posts this response to the chat.

Figure 13A:
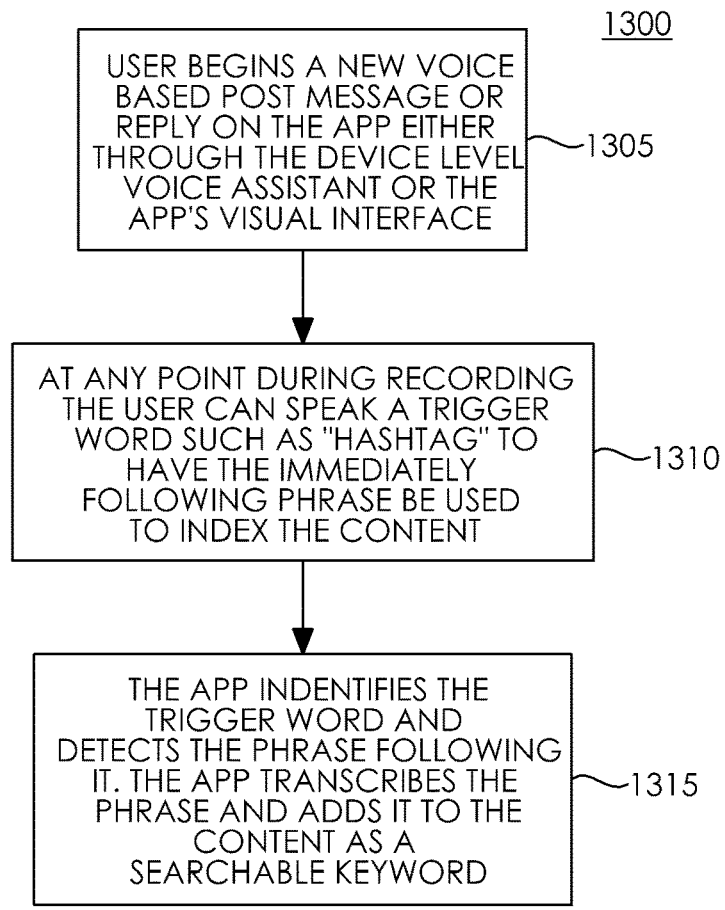
FIGS. 13A-13B together depict a process flow of an exemplary device-level voice assistant manager process implementing verbal hashtagging via a device-level voice assistant.
Figure 13B:
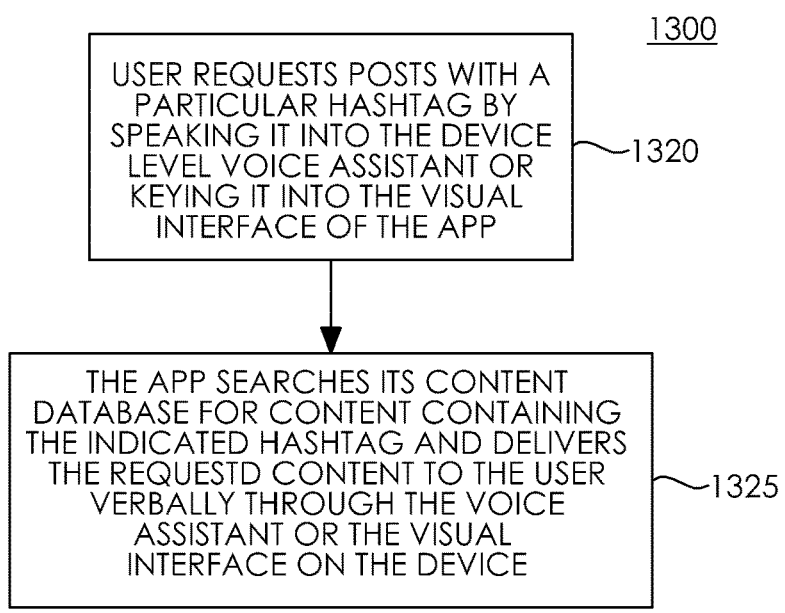

FIGS. 13A-13B together depict a process flow of an exemplary device-level voice assistant manager process implementing verbal hashtagging via a device-level voice assistant.

In FIG. 13A, verbal hashtag creation begins at 1305 with the user beginning a new voice-based post, message, or reply on the app, either through the device-level voice assistant, or the app visual interface. At 1310, at any point during recording, the user can speak a trigger word such as "hashtag" to have the immediately following phrase used to index the content. At 1315, the app identifies the trigger word and detects the phrase following; the app transcribes the phrase and adds the phrase to the content as a searchable keyword.

In FIG. 13B, retrieval of content based on a verbal hashtag continues at 1320 with the user requesting posts having a particular hashtag, by speaking the hashtag phrase into the device-level voice assistant or keying the phrase into the app visual interface. At 1325, the app searches the app content database for content matching the indicated hashtag, and delivers the requested content to the user verbally through the voice assistant or the device visual interface.

In an illustrative example of Verbal Hashtagging, although hashtags are a popular form of indexing text-based social posts for discovery by other users, various embodiment applications may use spoken keywords to sort verbal content for future discovery. For example, when the user indicates a trigger word, for example, "Hashtag", while making a verbal social post or direct message to the Vyrb platform via the device-level voice assistant or the app's visual interface, the app detects the immediate next phrase spoken and transcribes it internally. The spoken hashtag is added to representations of the content in the visual interfaces of the Vyrb app. Users can search and playback verbal content that contains a spoken hashtag in the Vyrb app, by searching the keyword in the visual interface or speaking the keyword in a command to the device-level voice assistant. For example, "Siri, play the latest #Friday posts on Vyrb." Particular trigger words can be selected or created by the user to perform automatic variations to the content, such as saying "Hashtag double" to make the recording play twice when opened by another user. In this case, the app would remove the voice content containing the trigger word and following command phrase from the recording before posting.

Figure 14:
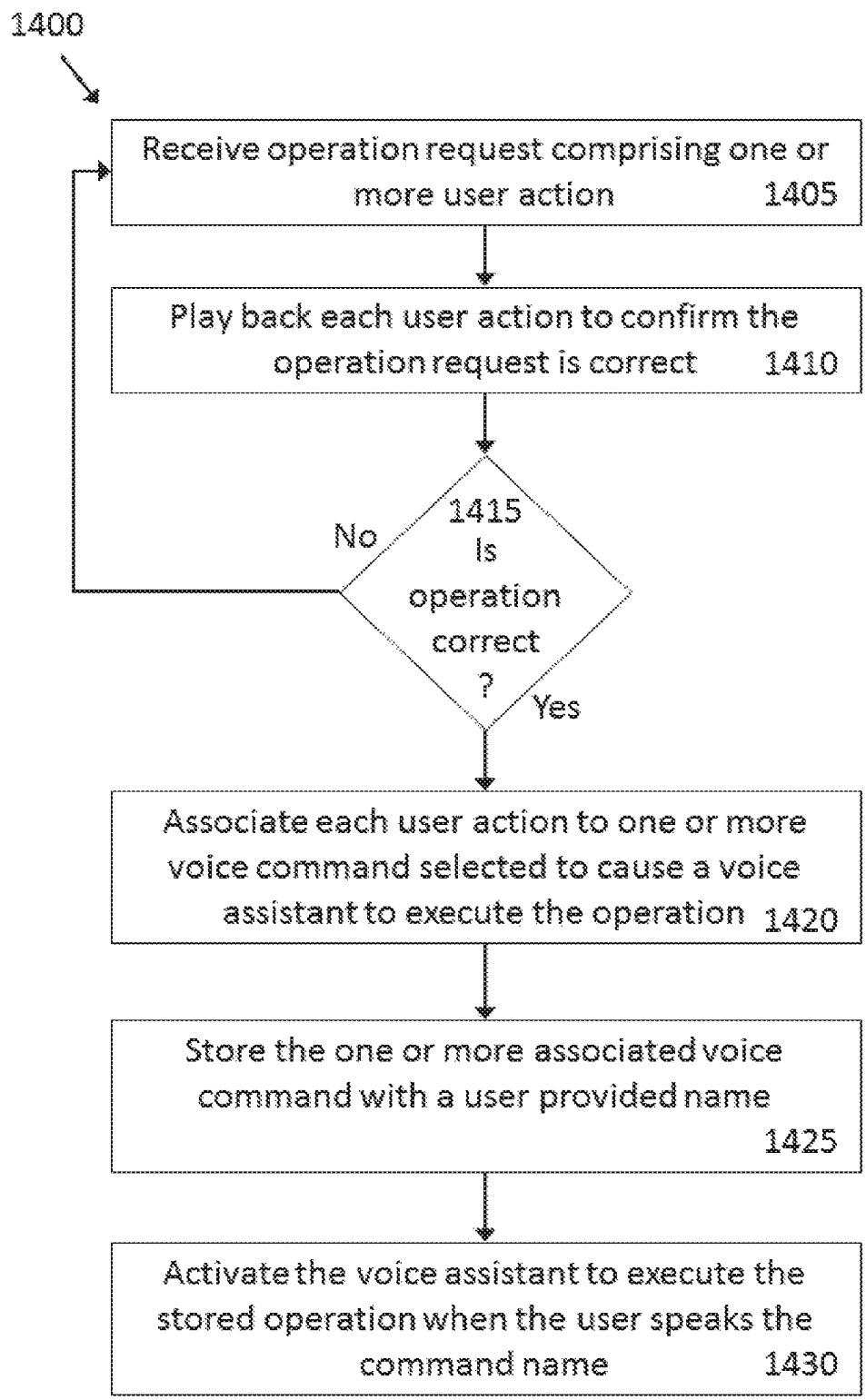
FIG. 14 is a flowchart depicting an exemplary device level voice assistant manager process constructing a voice command configured to implement a user requested operation using a device-level voice assistant.

FIG. 14 is a flowchart depicting an exemplary device level voice assistant manager process constructing a voice command configured to implement a user requested operation using a device-level voice assistant. In FIG. 14, the process 1400 begins at 1405, receiving an operation request comprising one or more user action. At 1410, the process plays back each user action to confirm the operation request is correct. At 1415, the process performs a test to determine if the operation is correct, based on the playback by the process at 1410. Upon determining the operation is correct, at 1420 the process associates each user action to one or more voice command selected to cause a voice assistant to execute the operation. At 1425, the process stores the one or more associated voice command with a user provided name. At 1430, the process activates the voice assistant to execute the stored operation when the user speaks the command name.

Figure 15:
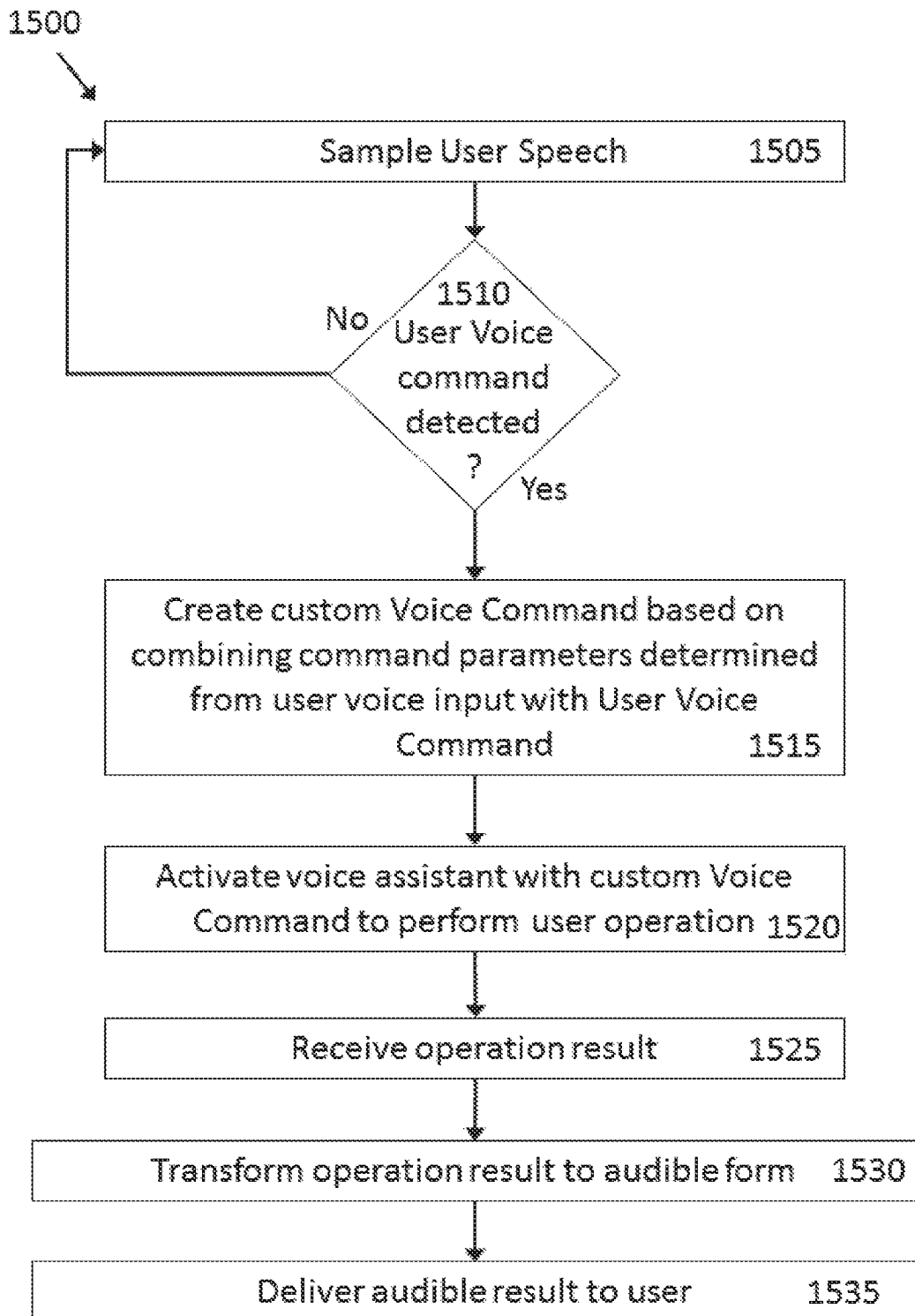
FIG. 15 is a flowchart depicting an exemplary device level voice assistant manager process implementing a user requested operation using a device-level voice assistant and delivering the operation to the user in audible form.

FIG. 15 is a flowchart depicting an exemplary device level voice assistant manager process implementing a user requested operation using a device-level voice assistant and delivering the operation to the user in audible form. In FIG. 15, the process 1500 begins at 1505 sampling user speech to detect a spoken command name. At 1510, the process performs a test to determine if a spoken user voice command is detected, based on the speech sampled by the process at 1505. Upon determining a spoken user voice command is detected, at 1515 the process creates a custom voice command based on combining command parameters determined from user voice input captured with the detected user voice command. At 1520, the process activates the voice assistant with the custom voice command to perform the user requested operation. At 1525, the process receives the operation result. At 1530, the process transforms the operation result to audible form. At 1535, the process delivers the audible operation result to the user.

Although various embodiments have been described with reference to the Figures, other embodiments are possible. For example, some embodiments may advantageously provide smartglasses, methods, and systems to control presentation and display of information related to mobile device tasks and applications to the smartglasses or a paired or connected smartwatch or smartphone, based on oral commands or requests, and enhance presentation and display augmented reality information, based on default settings of a device mobile application controlling display of information related to tasks and applications and oral override or switch commands. The smartglasses comprise corrective lenses, printed circuit board, battery, camera, microphone bone conducting speakers, connectivity module, artificial intelligence interface and run a smartglasses mobile application, the mobile application and artificial intelligence interface and are configured and programmed to communicate the requested tasks and applications to a mobile device application controlling display and presentation of information related to the requested tasks or applications, which can reside in the smartglasses, smartwatch, or smartphone.

Some embodiments of the present invention relate to smartglasses, and methods and systems to control mobile devices used for presentation and display of common mobile device tasks and applications and enhancing presentation and display of augmented reality information with smartglasses or other mobile devices paired or connected to smartglasses while not reducing visual acuity.

As described in further detail herein below, the methods and systems, and devices described herein employ a novel design to control mobile devices used for presentation and display of mobile device tasks and applications, enhance presentation, control and display of AR information with smartglasses or other mobile devices paired or connected to smartglasses, while not reducing visual acuity, and improve the synergistic functionality of wearable devices.

Augmented reality (AR) is an interactive experience of a real-world environment whose elements are "augmented" by computer-generated perceptual information, including visual and auditory information. The augmented information can be constructive (i.e., additive to the natural environment) or destructive (i.e., masking of the natural environment) and is seamlessly interwoven with the physical world such that it is perceived as an immersive aspect of the real environment.

By contrast, virtual reality completely replaces the user's real-world environment with a simulated one. More specifically, the present invention relates to methods and systems for using artificial intelligence (AI) to enhance experiencing augmented reality information and the performance of mobile computing tasks typically performed on a smartphone. Augmented reality information can be and has been included on devices resembling eyeglasses. Such smartglasses can include eyewear that employ cameras to intercept the real-world view and augment it with a virtual graphical or aural interface projected from their eyepieces directly onto the user's eye or onto a layer of a transparent lens (or to the user's ear in the case of audio-only smartglasses).

Examples of augmented reality smartglasses include Google Glass, Vuzix Blade AR, Vuzix M-100, Vuzix Wrap 310 L, Sony SmartEye Glass, Lockdown Focus, Everysight Raptor, Epson, Occulus, Lumis, Letin AR, Cast AR, Moverio BT-200, Meta, Laster See Thru, Icis, ORA-S, Glass UP, K-Glass, Solos, ODG AR/R8 and R9, Microsoft HoloLens, Optinvent Ora-2MG 5 Smart Glass AR, and GarminVaria Vision.

AR smartglasses have limitations. Presenting AR imagery in the glasses can occlude or obscure the ability of the user to use the glasses to improve their natural vision. This is a significant problem for persons who need the lenses of the AR smartglasses to be corrective lenses.

On the other hand, there are also limitations on AR smartglasses to present the AR imagery or auditory information in a manner that allows it to be viewed or heard effectively due to limitations in displaying AR imagery and presenting AR auditory information with smartglasses.

There are two categories of optical hardware solutions that seek to address this problem: conventional optical combiners and emerging waveguide combiners. But to date, optical hardware solutions have not proven to solve the problems of tradeoffs between visual quality, AR image quality and power consumption for portability and day long use.

Certain AR imagery or auditory information are more effectively viewed or heard using smartglasses, while other AR imagery or auditory information can be better and more easily viewed, heard or interacted with on other devices that can be paired or connected with the smartglasses, such as a smartwatch or smartphone. Using a smartwatch to view certain AR or standard mobile computing interface imagery can have advantages over a smartphone in that a user must continually hold a smartphone, whereas using a smartwatch affixed to the user's wrist to view interfaces would simply require moving the wrist or head to view the face of the watch, that is, handsfree operation.

Chinese Patent Application CN103309226A describes associating smartglasses with a smartwatch so that AR imagery can be viewed using the smartglasses or smartwatch. But the approach described in CN103309226A requires using a manual touch control unit on the smartglasses to control display to the smartwatch.

Chinese Patent Application CN105354161A describes a system for viewing and listening to information on different mobile devices that does not require manual operation. It automatically displays information on the device with the higher priority based on information stored in a priority judgment module. Although this approach improves on approaches requiring manual operation, it has its limitations and does not provide the user with the flexibility to have real-time control over the specific device for displaying specific information when the device does not have higher priority.

What is needed are improved methods and systems to enhance experiencing of augmented reality imagery and information, and common mobile computing tasks, among smartglasses having prescription lenses and other devices paired with or in communication with the smartglasses. For example, phones and smartwatches using voice controls that leverage the capabilities of artificial intelligence (AI) interfaces, such as Siri, Bixby or Alexa to control where AR information is viewed or heard while simultaneously mitigating the current AR visual limitations in regard to field of view, transparency, eye relief and eye box size.

As described below, wearable devices, such as bone conduction audio smartglasses and cellular-enabled smartwatches can interact with a user to supply them with useful information, often in a handsfree context. When these two types of wearables are working together, they can mitigate their individual weaknesses and create a near-complete mobile computing experience that can free the user from the need to carry a smartphone to perform common tasks.

By having smartglasses and a smartwatch working in tandem via a smartwatch mobile application, the shortcomings of each of these wearables can be covered by the other. As explained below, alternatively, the smartglasses and smartwatch could work in tandem via a smartglasses, smartwatch, or smartphone mobile application.

For example, the smartglasses are better at receiving audio input than the smartwatch, and the smartwatch is better at displaying visual content than the glass, so via the connective smartwatch mobile application, one could ideally see a video on the smartwatch while listening to it on the smartglasses. This particular "splitting" of an audiovisual data signal onto two devices would happen automatically, via the setting of user preferences in the smartwatch mobile application, the "Link" app described below. The smartwatch mobile application while running in the background performs the task of managing the output data of a particular application or task to best fit the user.

In one aspect, smartglasses are provided comprising a bridge, rims, the rims comprising corrective lenses, temples connected to end pieces, a printed circuit board, memory, battery, camera, microphone, bone conduction speakers, connectivity module, cellular communications unit and hardware, and artificial intelligence interface in electronic communication, the connectivity module and the cellular communications unit and hardware configured and programmed to pair or connect the smartglasses to a smartphone or smartwatch, the smartglasses configured and programmed to receive oral requests or commands at the microphone and artificial intelligence interface to perform mobile device tasks or applications and process and communicate the oral requests or commands to a mobile device application controlling paired or connected devices used for display or presentation of information related to the requested or commanded tasks or applications, the mobile device application controlling paired or connected devices used for display or presentation of information related to requested or commanded tasks or applications, configured and programmed to display or present information related to the requested or commanded tasks or applications on the smartglasses, a paired or connected smartwatch or paired or connected smartphone based on default settings.

In one embodiment, the default settings are stored in memory in lookup tables of the mobile device application controlling paired or connected devices used for display or presentation of information related to the requested or commanded tasks or applications and are set in a settings screen.

In another embodiment, the smartglasses further comprise a smartglasses mobile application, wherein the mobile device application controlling paired or connected devices used for display or presentation of information related to requested or commanded tasks or applications is the smartglasses mobile application.

In another embodiment, the mobile device application controlling paired or connected devices used for display or presentation of information related to requested or commanded tasks or applications is a smartwatch mobile application.

In another embodiment, the mobile device application controlling paired or connected devices used for display or presentation of information related to requested or commanded tasks or applications is a smartphone mobile application.

In another embodiment, the default settings for presenting augmented reality information related to SMS text messages are a paired or connected smartwatch.

In another embodiment, the artificial intelligence interface is configured and programmed to vocalize SMS text messages in the smartglasses and to receive and send orally dictated responses via SMS text messages.

In another embodiment, wherein the default settings for phone calls are the smartglasses.

In another embodiment, the default settings for phone calls further comprise presenting visual information on one or more of call duration, phone number, or and signal strength on a paired or connected smartwatch.

In another embodiment, the default settings for receiving push notifications is the paired or connected smartwatch.

In another embodiment, the default settings for receiving push notifications further comprise receiving audible information of push notifications at the smartglasses.

In another embodiment, the default settings for receiving visual information from navigation applications is the paired or connected smartwatch.

In another embodiment, the default settings for receiving audio information from navigation applications is the smartglasses.

In another embodiment, the default settings for a weather application, music application, or app store application is one or both of the smartglasses and the paired or connected smartwatch.

In another embodiment, the default settings for visual data from stock application is the paired or connected smartwatch and the smartglasses for pricing alerts.

In another embodiment, the default settings for video and video sound can be controlled from and displayed on one or both of the smartglasses and the paired or connected smartwatch or a paired or connected smartphone.

In another embodiment, the mobile device application controlling paired or connected devices used for display or presentation of information related to requested or commanded tasks or applications and the artificial intelligence interface are programmed to receive at the microphone oral commands to override or switch the default settings and display or present information as specified in the override or switch command and the smartglasses are configured and programmed to receive oral requests or commands at the microphone and artificial intelligence interface and process and communicate the oral requests or commands to the mobile device application controlling paired or connected devices used for display or presentation of information related to requested or commanded tasks or applications.

In another embodiment, the smartglasses mobile application and the artificial intelligence interface are programmed to receive at the microphone an oral switch or override command to switch display from a mobile device in the default settings to another paired or connected device or devices as specified in the switch or override command.

In another embodiment, the connectivity module is configured and programmed to pair or connect the smartglasses to smart home systems, including heating, cooling, or lighting systems.

In another aspect, a method for controlling display and presentation of information related to mobile device tasks or applications with smartglasses is provided comprising setting a device mobile application for controlling connected or paired mobile devices used for presentation and display of mobile device tasks or applications; pairing or connecting the smartglasses with one or more paired or connected mobile devices using a smartglasses connectivity module or a cellular communications unit and hardware, wherein the paired or connected devices include a smartwatch and a smartphone; making an audible command or request at a microphone of the smartglasses to display or present information related to the commanded or requested mobile device task or application; the smartglasses processing the command at an artificial intelligence interface of the smartglasses, the smartglasses comprising prescription lenses; communicating the command or request to the device mobile application controlling connected or paired mobile devices used for presentation and display of mobile device tasks; and receiving the information related to the commanded or requested mobile device task or application on the smartglasses or a paired or connected smartwatch or smartphone based on preset default settings.

In another embodiment, the preset default settings are stored in lookup tables on the device mobile application controlling connected or paired mobile devices used for presentation and display of mobile device tasks or applications.

In another embodiment, the device mobile application controlling the connected or paired mobile devices used for presentation and display of mobile device tasks or applications is a smartglasses mobile application.

In another embodiment, wherein the device mobile application controlling the connected or paired mobile devices used for presentation and display of mobile device tasks or applications is a smartwatch mobile application.

In another embodiment, the device mobile application controlling the connected or paired mobile devices used for presentation and display of mobile device tasks or applications is a smartphone mobile application.

In another embodiment, the method further comprises receiving an override or switch command at the smartglasses microphone to override or switch displaying the information related to the request or command to display or present information related to the commanded or requested mobile device task or application from a mobile device in the default settings to one or more other mobile devices paired or connected mobile devices, the smartglasses communicating the override or switch request to the device mobile application controlling the connected or paired mobile devices used for presentation and display of mobile device tasks or applications; and receiving the information related to the commanded or requested mobile device task or application at the one or more other mobile devices.

In another embodiment, the method further comprises pairing or connecting the smartglasses with smart home systems, including heating, cooling, or lighting systems; and controlling the smart home systems through voice commands spoken to the smartglasses.

In another embodiment, the method further comprises using the paired or connected mobile devices used for communicating with public blockchains, and perform blockchain transactions.

In another embodiment, the method further comprises using the paired or connected mobile devices mobile device tasks or applications reading and acting on QR codes or unique biometric identifier data.

In another embodiment, the method further comprises using the paired mobile devices for communicating biometric security information and using the biometric security information to perform cryptographic functions performed in a token wallet application.

Various embodiments provide methods for improving the functionality of AI voice assistants on web-enabled devices, and facilitating improved communication between users of an audio-based social or private communication platform. In an illustrative example, some embodiment implementations may be referred to as 'Vyrb.'

An exemplary Vyrb application may be configured to use a virtual interface on a web-enabled device permitting a user to create new voice commands for use with a device-level voice assistant such as Google Voice, which enable the user to perform new handsfree functions such as audibilizing or verbalizing audibly real time web data or starting a new action in another app. In an interface of an exemplary Vyrb app, the user can begin the process of creating a new voice assistant command. There are two main types of commands, one is data retrieval and the other is an action or series of actions. When the user begins to create a Data Retrieval voice command, the Vyrb app opens a browser that allows them to explore the web and other apps on their phone, and draw a virtual "fence" around a particular area that contains textual information. Once the user confirms and names the command, they will be able to retrieve this data via a newly created voice command for the device-level voice assistant. The voice assistant will then interface with the Vyrb app to collect the designated data in real time, and use the voice assistant's text-to-speech engine to vocalize it for the user. Thus the user is able to retrieve updated data from their favorite websites and apps with just their voice. Even if it is not standard selectable text, the app can analyze any area containing text and vocalize it. When the user begins to create an Action voice command, the Vyrb app minimizes into the background and begins recording user actions, such as tap actions and/or text entries. When the user is finished, they confirm the action or series of actions, name it, and the app uses its algorithm to create a new voice command for the device-level voice assistant. When initiated, the Vyrb app replicates the pre-defined user actions for that command.

In an illustrative example of a Vyrb embodiment Voice Command Creation Algorithm, the apps is configured with particular coding to enable them to be interacted with by device-level voice assistants such as Google Voice or Siri. The present methods describe a new user capability, that of being able to add to this interaction code by defining particular web or app data to be collected and verbalized through the voice assistant, or particular user action(s) to be performable by the Vyrb app via a command to the voice assistant. The user defines the name of the data selection or action(s) during command creation, and this name then becomes the voice command itself. For example, a voice command created in this way might look like: "Siri, Vyrb CNN". Then the user's selected area of CNN headlines will be found by the app, then vocalized to the user through the voice assistant's native text-to-speech engine.

In an illustrative example, in addition to facilitating easier access to data and user action(s) via a web-enabled device's voice assistant, an exemplary Vyrb app may include other functions to enhance communication between individuals, groups or the users of a social network. For example: Verbal Commenting, through pre-selected app settings for the device-level voice assistant, the user can retrieve verbal content such as social posts and direct messages, and respond to them verbally; this is a novel user capability, because even in other apps that focus on verbal content, the commenting is all textual and must be done by hand through a visual interface, whereas this defines a new capability via user-selected enhancements to the device-level voice assistant AI. This feature allows the app user to respond to comment-enabled posts such as web blogs, social posts from other platforms ported into the Vyrb app, posts within the Vyrb app such as verbal status updates, and direct messages received from the Vyrb app, completely handsfree via the device-level voice assistant. This feature can also be used to respond to Data Retrieval user-created commands, when the selected area for retrieval includes a comment entry field. In the background, app would transcribe the verbal comment into this field as text and post it. In the case of Vyrb-native verbal social posts and direct messages, the response is posted as the unaltered voice content. The user can both request this content for playback and respond to it (as a reply or comment as appropriate) using only the device-level voice assistant. When a similar process is used to retrieve and respond to other social media platform posts, such as a Twitter feed imported into the user's profile to make it voice assistant-accessible, the app can act in the background to automatically transcribe the prompted response as a comment directly on the original Twitter post. Types of response prompts the user can enable with this feature include replies, comments, "like" actions and sharing actions.

In an illustrative example, Key Examples of Verbal Hashtagging include: a user records a new post with the voice assistant, and at the end of the recording, they speak the trigger word "hashtag", followed by the phrase "Victory"; now, other users who are searching for content associated with "Victory" can find the post, either by interfacing with Vyrb through the voice assistant or in the app's visual interface; and, a user initiates a new voice post in the app's visual interface, recording their message and ending it with the phrase "hashtag Florida." The user has created a preselected setting that adds a layer of Florida-esque sound effects to the verbal content, such as waves on the beach.

In an illustrative example, an embodiment Vyrb implementation may permit a user to create a verbal "hotkey" configured to trigger on-demand activation of a customizable range of data retrieval and user action patterns. Such a customizable range of verbally triggered actions may be advantageous for someone who has vision difficulties or other conditions that precludes them from full use of a phone, such as, for example, someone in a wheelchair, who needs their hands for mobility, can use the app in addition to a light wearable, such as Bluetooth glasses, to program and perform a majority of functions they need from their phone, on a much deeper and more intuitive level than currently possible with the phone's native voice assistant alone. Similar advantages resulting from various embodiments' usage may accrue to a visually impaired person, who could have a family member program their desired functions for them. For example, a visually impaired person may program a voice assistant function to begin navigating to their home, where the visually impaired person may find it difficult to relay a specific address to the voice assistant alone accurately.

In an illustrative non-limiting example, various implementation embodiments may provide a social media app for smartphones and smartwatches for creating and listening to verbal content, aided by Lucyd Bluetooth glasses and other Bluetooth or wireless devices. Instead of typing a status update or comment as in a typical social media app, you say it aloud, and others hear your post/blog/comment instead of reading it. The app also supports traditional textual and graphic content. There are functions for using the app through the phone or watch's voice assistant, as well as a visual interface consisting of user feeds and profiles. The app can also capture and relay text-to-speech or speech to text versions of your feeds on other social media platforms and enable the user to respond to these feeds with your voice.

Social media platforms have greatly expanded the connectivity and sharing amongst individuals, however, all major platforms utilize either text or images for content generation. In mobile applications, the use of these platforms and the generation and response to content pose ergonomic problems in creating and sharing information. Keying or taking a picture and sending it to others requires user attention to the interface and may distract the user from situationally more important tasks such as driving, ambulating safely, performing physical activities of every variety such as cycling, walking, running, physical work tasks such as operating equipment, etc. Underscoring this point is that in the past few years since the advent and utilization of social media, pedestrian accidents and deaths have increased precipitously. Additionally, the ability to interact with social media through voice enables both a transparent and device independent interface for information sharing, coupled with the ability to reach, listen to and respond to a much larger audience with simultaneous voice translation in a handsfree manner, whether through Bluetooth connectivity or other wireless technology. Finally, voice-based social media adds the missing component of human emotion achievable through the intonation, volume, parsing and emphasis of the voice message, thereby making the communication more personal, contextually relevant and impactful.

The goal of the Vyrb app is to enable the user to easily speak their world, and hear the thoughts of those they care about. The app will bring back the emotion lost in text messaging, and allow for significantly more personal interactions within the proven tempo and organizational interfaces of social media. The use of voice on balance will enhance authenticity and trust of social media communications by mitigating the anonymity of shared content.

Hands free features accessible through the voice assistant:

In various examples, primary functions can be accessed hands-free through the phone or watch's voice assistant on the phone or watch or via any Bluetooth enabled accessory. Expanded functionality and manipulation of settings for these functions are accessed by opening the app on the phone or watch.

1. Ability to post vocal status updates/blogs to your Vyrb profile. The user can activate their voice assistant via the phone or watch, or connected Bluetooth glasses, and record a message to be posted to their profile on the app. Based on user selected settings, the voice assistant then plays back the recorded message or a speech-to-text transcription of the message, whereupon the user selects to send or rerecord the message by voice command. Although the app will emphasize Verbal communication, the user will have the option to have their posts and comments made via voice and transcribed into text for actual posting.
2. Auto speech-to-text reposting to other social media platforms. Based on user-selected settings, the app can be linked to other social media platforms via API, and the user can have their Vyrb posts automatically transcribed into text and reposted to other platforms such as Facebook. The user can also dictate a vocal post to their profiles on other platforms and direct messages to users on other platforms, without posting to the Vyrb app. For example, "Hey Siri, use Vyrb to send a message to John Q on Facebook." The app would then prompt the user to record the message, which would be sent as a voice message (if permitted by the other platform) or transcribed into text and sent.
3. Social media aggregation with text-to-speech for combined verbal news feed. Based on user-selected settings, the user can link their other textual social media feeds into the Vyrb app, for playback with a single verbal command. For example, the user can link their Twitter accounts to hear their Twitter feed read aloud, independently or in time-stamp order with their Vyrb feed. The basic function for this command will simply play back the user's Vyrb feed from newest to oldest unread or vice-versa, based on user-selected settings.
4. Notifications and voice prompt to respond verbally to incoming comments/messages on social. User can select particular followed users on Vyrb or other linked social platforms for verbal notifications. When an indicated user makes a new post, a standard push notification appears on the phone or watch. Tapping the notification opens the Vyrb app and begins playing the new message, and provides a voice prompt button to respond to the message verbally on the device or in the connected Bluetooth glasses. Alternatively, the user can select settings to play the new message without opening the app.
5. The ability to record, send and receive direct voice messages, walkie-talkie style, to other individual users or group chats on the app. Through the voice assistant, the user can initiate a direct voice message to other app user(s) to start a private conversation. When the app is running in the background, the user will receive push notifications on new incoming messages, which they can tap to be brought to the conversation on the app, hear the new message, and hit a button to record a new reply. When the app is actively running, new incoming messages in the chat will be played automatically when received, even when the phone or watch screen is locked, unless the conversation is muted. The user can then reply by activating the voice assistant on the phone or watch, or tapping a prompt button when the app is fully open.
6. VoiP calling features. The ability to initiate and receive VoiP calls through the voice assistant. VoiP calls made on the app can be recorded or transcribed into text. For contract purposes, both parties to a call can agree to record and transcribe a verbal agreement, whereupon a true record of the conversation is uploaded into the cloud and accessible by both parties (in the form of an immutable, non-deletable file in the private chat).

Core Features Accessed Via the Application Interface

The app has four main interface screens: A News Feed screen, a Profile screen, Private Chats screen, and a Settings panel.

1. News Feed Interface
    a. The News Feed screen is the user's feed of followed accounts, and is the app's homescreen. It will consist of posts that contain verbal or textual, and graphical, information. Posts that are from other social media platforms which have been supplied to feed via API will be indicated with an icon for that platform, tapping which takes the user to the original post in the appropriate app or in the browser.
    b. Each post has interaction buttons for liking, sharing, commenting via voice, and commenting via text.
    c. Sharing a Vyrb post, called a "ReVyrb", reposts it in the user's Profile with citation, or it can be shared outside the app. When shared outside of the app into a platform that does not support voice messages, the app will transcribe it into text.
    d. A prominent Microphone button appears on the three main interfaces of the app in a bottom corner. This button will initiate a pop-up prompt for the user to begin recording a new post or private one-on-one or group chat. The user can elect to type their message instead. Translation, audience and platforms posted to can be chosen with quick toggles before the message is sent (e.g., toggle on reposting to Facebook, toggle between feed post and private chat, toggle on voice-to-text translation into Spanish.)
    e. Single-tapping a post in the feed allows the user to "like" it, tapping again to remove the like. Double-tapping brings up a commenting prompt, automatically activating the voice prompt for a vocal comment to be recorded and posted as a reply to the original post. Triple-tapping a post takes the user to poster's Profile.
2. Profile Interface
    a. The Profile interface is where the user controls their public image in the Vyrb app. The top of the screen is the user's profile, which they can tap into to edit their vocalized profile name, voice greeting, profile picture, bio and link external profiles/contact methods. The rest of the interface is the user's newsfeed from newest to oldest in descending order.
    b. User stats, including number followed and following, appears in the user profile. Tapping one of these stats opens a pop up showing more information (such as all subscribed users). Tapping the "Followers" stat allows the user to search their followers and initiate a private chat with them.
    c. The user can edit, delete and share their previous posts.
    d. Users have the ability to upload photos or video as part of their Vyrb post or private message, in conjunction with text or speech.
    e. Profile and Private Chat new message interfaces will have a translated-chat function, where the user can speak or type one language and have their message translated into speech or text in another language. Enabling the translation function in a private chat will continue to translate your new messages in the that chat until toggled off manually.
3. Private Chat Interface
    a. The top-level of this interface will look like many other chat apps, with a combination of the user's group and direct messages.
    b. Tapping into a private chat will open the chat. Swiping the chat will delete it.
    c. Within a chat, the Microphone button becomes embedded next to the text input, indicating that a new recording will post to the active chat.
    d. When a chat is open, any incoming voice messages will automatically be played through the device's speakers or the connected Bluetooth glasses.
    e. In a direct private chat, either user can add more users to the chat to make it a group chat.
    f. Users can "ReVyrb" a private voice or text message onto their feed, but the app will prompt the other user(s) in the chat for consent first. (This can be adjusted in Settings to allow all private chats to be ReVyrbed without consent).

4. Settings Interface
   a. Initial setup of app settings and tutorial takes place with user voice prompts naming the desired settings.
   b. In the Settings, users can connect other social media profiles for reposting and feed aggregation.
   c. Users can toggle their preferred default settings for voice and textual posts and private chats.
   d. Control voice login settings and API.
   e. Sound tests and mixing panel to optimize user voice input on the phone, watch or Bluetooth accessory.

Core Functionalities of the App
1. Speech to text functionality
2. Speech to speech functionality
3. Verbal commenting on social media
4. Verbal posting on social media
5. Verbal direct message
6. Verbal group chat
7. Walkie Talkie functionality
8. Web calling functionality
9. Verbal posting to multiple social media platforms
10. Sharing of verbal messages
11. Voice print login to the app
12. Voice print login API (login to other apps with voice)

One skilled in the art will realize the invention may be embodied in other specific forms without departing from the spirit or essential characteristics thereof. The foregoing embodiments are therefore to be considered in all respects illustrative rather than limiting of the invention described herein.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability. All functionalities described above could also be provided by private or Public cloud-based Data Centers (DC).

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Flowcharts described herein illustrate the functionality and operation of an implementation of portions of various embodiments. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts described herein may illustrate a specific order of execution, it is understood that the order of execution may differ from that which is depicted. For example, the order of execution of two or more blocks may be scrambled relative to the order shown. Also, two or more blocks shown in succession in a flowchart may be executed concurrently or with partial concurrence. Further, in some embodiments, one or more of the blocks shown in a flowchart may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

In the Summary above and in this Detailed Description, and the Claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In various embodiments, elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of embodiments of the invention, may be combined in any configuration excepting those readily apparent to the person skilled in the art as nonsensical. Likewise, use of the singular and plural is solely for the sake of illustration and is not to be interpreted as limiting.

The Abstract is provided to comply with 37 C. F. R. § 1.72(b), to allow the reader to quickly ascertain the nature of the technical disclosure and is submitted with the understanding that it will not be used to interpret or limit the scope or meaning of the claims.

In the present disclosure, all embodiments where "comprising" is used may have as alternatives "consisting essentially of," or "consisting of." In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Many suitable methods and corresponding materials to make each of the individual parts of embodiment apparatus are known in the art. According to an embodiment of the present invention, one or more of the parts may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described herein-above may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects may lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on this application based hereon. Accordingly, the disclosure of the embodiments of the invention is intended to be illustrative, but not limiting, of the scope of the invention.

The invention has been described in terms of particular embodiments. The alternatives described herein are examples for illustration only and not to limit the alternatives in any way. The steps of the invention can be performed in a different order and still achieve desirable results. It will be obvious to persons skilled in the art to make various changes and modifications to the invention described herein. To the extent that these variations depart from the scope and spirit of what is described herein, they are intended to be encompassed therein. It will be understood by those skilled in the art that various changes in form and details may be made therein without departing from the scope of the invention encompassed by the appended claims.

What is claimed is:

1. A web-enabled mobile device apparatus comprising:
    a processor; and,
    a memory that is not a transitory propagating signal, the memory operably and communicatively coupled with the processor and encoding computer readable instructions, including processor executable program instructions implementing a voice assistant manager software application, the computer readable instructions accessible to the processor, wherein the processor executable program instructions, when executed by the processor, cause the processor to perform operations comprising:
        receiving a request for the web-enabled mobile device or a web-enabled mobile device paired or connected to the web-enabled mobile device comprising a processor and a memory, to perform a web-enabled operation;
        recording the web-enabled operation and associating the web-enabled operation with a voice command;
        configuring the voice command for a device level voice assistant to implement the web-enabled operation, wherein the voice command is configured as a function of the recorded operation;
        performing the web-enabled device operation at the web-enabled mobile device or a web-enabled mobile device paired or connected to the web-enabled mobile device; and,
        providing an operation result at the web-enabled mobile device or a web-enabled mobile device paired or connected to the web-enabled mobile device when the device level voice assistant is activated with the configured voice command.

2. The web-enabled mobile device of claim 1, wherein the operations further comprise playing back the web-enabled operation to confirm the web-enabled operation is correct before saving the web-enabled operation in the memory and associating the operation with the configured voice command.

3. The web-enabled mobile device of claim 2, wherein the web-enabled mobile device or the web-enabled mobile device paired or connected to the web-enabled mobile device further comprises a visual interface configured in a web-enabled device accessible to the processor.

4. The web-enabled mobile device of claim 3, wherein the web-enabled device or the web-enabled device paired or connected to the web-enabled device further comprises an audio interface, and the operations performed by the processor further comprise audibilizing or verbalizing audibly the operation result to a user through the audio interface.

5. The web-enabled mobile device of claim 4, wherein audibilizing or verbalizing audibly the operation result further comprises transforming the operation result into a non-verbal audio representation.

6. The web-enabled mobile device of claim 4, wherein audibilizing or verbalizing audibly the operation result further comprises transforming the operation result into a verbal audio representation.

7. The web-enabled mobile device of claim 4, wherein receive the request further comprises a user action captured from the visual interface.

8. The web-enabled mobile device of claim 7, wherein configuring the voice command further comprises decompose the user action into at least one action component related to a function of the device level voice assistant.

9. The web-enabled mobile device of claim 7, wherein configuring the voice command further comprises associate a voice assistant capability with one or more action component related to a function of the device level voice assistant.

10. The web-enabled mobile device of claim 7, wherein the user action further comprises an action selected from the group consisting of text selection, form input, audio input, and link activation.

11. The web-enabled mobile device of claim 1, wherein the web-enabled operation further comprises a verbal hashtag operation.

12. The web-enabled mobile device of claim 1, wherein the web-enabled operation further comprises a verbal comment operation.

13. The web-enabled mobile device of claim 1, wherein the web-enabled operation further comprises an action operation.

14. The web-enabled mobile device of claim 1, wherein the web-enabled operation further comprises a data retrieval operation.

15. A device level voice assistant manager process implemented on a web-enabled computing device, wherein the web-enabled computing device comprises: a processor, and, a memory coupled with the processor, and wherein the memory encodes processor executable program instructions and data to program and configure the processor to perform operations comprising:
    receiving a user request captured by a user interface configured in the web-enabled computer device or a web-enabled computer device paired or connected to the web-enabled computer device to perform a web-enabled operation;
    recording the web-enabled operation, wherein the web-enabled operation comprises one or more user action;
    playing back the recorded web-enabled operation to confirm the web-enabled operation is correct;
    in response to confirming the recorded web-enabled operation is correct:
        saving the web-enabled operation in the memory;
        configuring a voice command executable by the device level voice assistant manager process to implement the recorded web-enabled operation, wherein the voice command is configured based on associating a device level voice assistant function with one or more user action included in the confirmed correct recorded web-enabled operation;
        performing the operation at the web-enabled computer device or a web-enabled computer device paired or connected to the web-enabled computer device, based on activating the device level voice assistant with the configured voice command; and,
        providing an operation result to a user when the device level voice assistant is activated.

16. The process of claim 15, wherein the web-enabled operation further comprises a user action selected from the group consisting of text selection, form input, link activation, and audio input.

17. The process of claim 15, wherein an operation type is selected from the group consisting of action, and data retrieval.

18. The process of claim 15, wherein the web-enabled operation further comprises an audio operation.

19. The process of claim 18, wherein the audio operation further comprises a verbal hashtag operation.

20. The process of claim 18, wherein the audio operation further comprises a verbal comment operation.

21. A process to create a voice command executable by a device level voice assistant to implement an operation for a web-enabled device, the process comprising:
    receiving an operation request for the web-enabled device or a web-enabled device paired or connected to the web-enabled device to perform a web-enabled social media operation;
    recording an operation, wherein the operation comprises one or more user action;
    playing back the recorded operation to confirm the operation is correct;
    in response to confirming the recorded operation is correct:
        storing the operation;
        configuring a voice command executable by the device level voice assistant to implement the operation, wherein the voice command is configured based on associating a device level voice assistant function with one or more user action included in the confirmed correct recorded operation;
        performing the operation at the web-enabled device or a web-enabled device paired or connected to the web-enabled device, based on activating the device level voice assistant with the configured voice command; and,
        providing an operation result at the web-enabled device or the web-enabled device paired or connected to the web-enabled device when the device level voice assistant is activated with the configure voice command.

22. The process of claim 21, wherein the web-enabled social media operation further comprises an audio operation.

23. The process of claim 22, wherein the audio operation further comprises retrieve from a social media platform a social media post located as a function of an audio hashtag or audio comment identified based on audio provided with the operation request.

24. The process of claim 22, wherein the audio operation further comprises:
- transforming the retrieved social media post to audible form;
- delivering the audible social media post to a user;
- receiving audio comprising a user response to the audible social media post; and,
- posting the user response to the social media platform.

25. Smartglasses comprising:
- a bridge, rims, the rims comprising corrective lenses, temples connected to end pieces,
- a printed circuit board, memory, battery, camera, microphone, bone conduction speakers, connectivity module, cellular communications unit and hardware, and artificial intelligence interface in electronic communication,
- the connectivity module and the cellular communications unit and hardware configured and programmed to pair or connect the smartglasses to a smartphone or smartwatch and support active priority for the smartphone, the smartwatch, or both the smartphone and the smartwatch,
- the smartglasses configured and programmed to receive oral requests or commands at the microphone and artificial intelligence interface to perform mobile device tasks or applications and process and communicate the oral requests or commands to a mobile device application controlling paired or connected devices used for display or presentation of information related to requested or commanded tasks or applications,
- the mobile device application controlling paired or connected devices used for display or presentation of information related to requested or commanded tasks or applications, configured and programmed to display or present information related to the requested or commanded tasks or applications on the smartglasses, a paired or connected smartwatch or paired or connected smartphone based on default settings, activate connections between the smartglasses, the smartphone, or the smartwatch with additional devices having higher priority until a capacity for connections with the smartglasses, the smartphone, the smartwatch or the additional devices is reached,
- the mobile device application controlling and managing priority of wifi networks, wireless connections to the smartglasses and the devices paired or connected to the smartglasses through the oral commands.

* * * * *